US012374988B2

(12) United States Patent
Lumanog

(10) Patent No.: US 12,374,988 B2
(45) Date of Patent: Jul. 29, 2025

(54) FAULT-RESPONSIVE POWER SYSTEM AND METHOD USING ASYNCHRONOUS LOAD CURRENT SWITCHING

(71) Applicant: EQUINOX POWER INNOVATIONS INC., Vancouver (CA)

(72) Inventor: Glenn Lumanog, Surrey (CA)

(73) Assignee: Equinox Power Innovations Inc., Vancouver (CA)

( * ) Notice: Subject to any disclaimer, the term of this patent is extended or adjusted under 35 U.S.C. 154(b) by 454 days.

(21) Appl. No.: 17/698,893

(22) Filed: Mar. 18, 2022

(65) Prior Publication Data

US 2023/0299661 A1    Sep. 21, 2023

(51) Int. Cl.
  *H02M 1/32*   (2007.01)
  *H02M 1/00*   (2006.01)
  *H02M 3/155*  (2006.01)

(52) U.S. Cl.
  CPC .......... *H02M 1/32* (2013.01); *H02M 1/0009* (2021.05); *H02M 3/155* (2013.01)

(58) Field of Classification Search
  CPC .... H02M 1/00; H02M 1/0009; H02M 1/0012; H02M 1/0029; H02M 1/0043; H02M 1/32; H02M 1/322; H02M 1/36; H02M 3/155; H02M 3/156; H02M 3/22; H02M 3/24; H02M 3/285; H02M 3/335; H02M 3/33569; H02M 3/33571; H02M 3/33573; H02M 3/33576; H02M 3/33584; H02M 3/33592;
(Continued)

(56) References Cited

U.S. PATENT DOCUMENTS 6,184,666 B1   2/2001   Boeckmann et al.
8,068,937 B2   11/2011  Eaves
(Continued)

FOREIGN PATENT DOCUMENTS

EP    0038852        11/1981
WO    WO/2022/187095  2/2022
(Continued)

OTHER PUBLICATIONS

Gallo, Ernie, "The Power of 5G", Web page <https://isemag.com/2021/06/telecom-2021-small-cells-5g-powering/>, Jun. 21, 2021.
(Continued)

*Primary Examiner* — Thienvu V Tran
*Assistant Examiner* — Carlos O Rivera-Perez

(57) ABSTRACT

A fault-responsive power system and method using asynchronous load current switching. A first supply-side current that flows from a power supply into a first conductor, which electrically couples the power supply to a load, is measured. Power is delivered to the load by modulating a first remote-side current on and off, with the remote-side current entering the load from the first conductor. Once it is determined that the first supply-side current has met or exceeded a magnitude threshold for at least a duration threshold, the first supply-side current is reduced such that the first supply-side current is less than the magnitude threshold. A data signal may also be transmitted by embedding a data signal in the first remote-side current through the modulation of the first remote-side current, and demodulating the data signal in the first supply-side current.

39 Claims, 22 Drawing Sheets

(58) Field of Classification Search
CPC .. H02H 7/00; H02H 7/22; H02H 7/26; H02H 7/261; H02H 7/262; H02H 7/263; H02H 5/00; H02H 5/12; H02H 9/00; H02H 9/001; H02H 9/002; H02H 3/08; H02H 3/087; H02H 3/093; H02H 3/0935; H02H 3/10; H02H 3/105; H02H 3/16; H02H 3/162; H02H 3/165; H02H 3/167
USPC ........ 323/223–226, 266, 270, 271, 273–277, 323/282–285, 351, 908; 363/15–17, 41, 363/42, 50–58, 65; 361/42–50, 62–69, 361/71, 74, 75, 78–81, 83, 87, 93.1–102; 700/286, 292, 293, 294, 297, 298
See application file for complete search history.

(56) References Cited

U.S. PATENT DOCUMENTS

| | | | |
|---|---|---|---|
| 8,674,673 B2* | 3/2014 | Hung | H02M 3/1588 323/283 |
| 9,184,795 B2 | 11/2015 | Eaves | |
| 9,425,614 B2 | 8/2016 | Xiong et al. | |
| 9,496,702 B2 | 11/2016 | Dong et al. | |
| 9,906,303 B2 | 2/2018 | Michaelis et al. | |
| 9,941,917 B2 | 4/2018 | Wang et al. | |
| 10,257,056 B2 | 4/2019 | Jazani et al. | |
| 10,261,560 B2 | 4/2019 | Hunter, Jr. et al. | |
| 10,348,093 B2 | 7/2019 | Suryanarayana et al. | |
| 10,396,844 B2 | 8/2019 | Coleman et al. | |
| 10,470,120 B2 | 11/2019 | Fischer | |
| 10,476,264 B2 | 11/2019 | Vijayan et al. | |
| 10,658,837 B2 | 5/2020 | Hazani | |
| 10,712,515 B2 | 7/2020 | Chamberlain et al. | |
| 10,735,105 B2 | 8/2020 | Goergen et al. | |
| 10,742,131 B2 | 8/2020 | Wang et al. | |
| 10,812,664 B2 | 10/2020 | Kostakis et al. | |
| 10,816,601 B2 | 10/2020 | Yang et al. | |
| 10,912,025 B2 | 2/2021 | Coleman et al. | |
| 11,129,095 B2 | 9/2021 | Gandhi | |
| 11,294,409 B2 | 4/2022 | Chamberlain et al. | |
| 11,444,791 B2* | 9/2022 | Jones | H04L 12/10 |
| 11,923,678 B2 | 3/2024 | Potterf et al. | |
| 2012/0063037 A1* | 3/2012 | Konecny | H02H 3/027 361/18 |
| 2012/0075759 A1 | 3/2012 | Eaves | |
| 2013/0070379 A1* | 3/2013 | Pan | H02H 3/093 361/87 |
| 2013/0103220 A1* | 4/2013 | Eaves | H02H 7/261 700/293 |
| 2016/0352091 A1 | 12/2016 | Qi et al. | |
| 2020/0295955 A1 | 9/2020 | O'Brien et al. | |
| 2021/0382102 A1 | 12/2021 | Siddique et al. | |
| 2022/0360067 A1 | 11/2022 | Inada et al. | |

FOREIGN PATENT DOCUMENTS

| | | |
|---|---|---|
| WO | WO/2022/187485 | 3/2022 |
| WO | WO/2022/177850 | 8/2022 |

OTHER PUBLICATIONS

"Universal Asynchronous Receiver Transmitter (UART)", Webpage <https://www.infineon.com/dgdl/Infineon-Component_UART_V2.20-Software+Module+Datasheets-v02_05-EN.pdf?fileId=8ac78c8c7d0d8da4017d0e7f95451159&utm_source=cypress&utm_medium=referral&utm_campaign=202110_globe_en_all_integration-files>, May 23, 2012.

International Search Report from the Canadian Intellectual Property Office acting as International Searching Authority for International Application Serial No. PCT/CA2023/050353, dated Jun. 20, 2023, 3 pages.

* cited by examiner

FAULT-RESPONSIVE POWER SYSTEM AND METHOD USING ASYNCHRONOUS LOAD CURRENT SWITCHING

TECHNICAL FIELD

The present disclosure is directed at a fault-responsive power system and method using asynchronous load current switching.

BACKGROUND

Generally speaking, power distribution systems can be put into either of two categories: those that rely on local powering, and those that rely on centralized power distribution.

For example, in an application such as powering remote RF radios in wireless telecom networks, local powering is implemented by installing power conversion devices that tap electricity directly from the electric utility grid, and that then convert the AC electricity to lower voltage DC electricity that is usable for the intended loads. The major drawbacks with this powering method are a relatively high cost of acquiring multiple power meters, a longer turn-around time to get the requisite permitting for site acquisition, and the fact that this method is not economically feasible and scalable for mass deployment because of the sheer volume of remote powered devices and equipment required.

Centralized power distribution is often preferred over local powering. A centralized powering solution, also known as adopting a "hub and spoke" topology in industry, leverages a single connection to the electric utility grid from which a centralized power hub derives power. The centralized power hub then distributes the power to multiple remotely located network devices that can be installed thousands of feet away from the centralized power source.

The industry typically implements centralized power distribution in either of two ways. The more common method is "Remote Feeding Telecommunications-Voltage limited" ("RFT-V"). An emerging and newer approach is referred to as "centralized bulk powering" or using a "Fault Managed Power System".

In traditional RFT-V line powering, multiple loads in different locations are supplied remotely from a single centralized power source using multiple conductor pairs in a one-to-one configuration; that is, one dedicated conductor pair or set of conductor pairs is used for each remote load. To facilitate efficient delivery of power over longer distances, the line voltage is usually boosted to +/−190 VDC or 380 VDC peak-to-peak. However, the total permitted power per circuit is limited to 100 W for safety reasons. In essence, the system is inherently safer due to relatively low power operation, but this also creates a serious disadvantage: because of that power constraint, RFT-V line powering is not cost effective for applications where the remote loads demand power consumption that exceeds that constraint. An example of such an application for which RFT-V is unsuitable is powering next-generation remote small cells for 5G cellular networking, which have a relatively high power requirement and are deployed in high volumes for network coverage densification. This is because as the demand of power increases, so does the total number of conductor pairs and power conversion devices. Other drawbacks for RFT-V line powering are the cable weight resulting from under-utilized conductor pairs and the fact that RFT-V infrastructure cannot be upgraded after initial installation without incurring a substantial capital expenditure.

In centralized bulk powering, instead of using power-limited circuits in which power is transmitted via multiple pairs of smaller wires, centralized bulk powering transmits an elevated voltage (e.g., any voltage between 300 to 450 VDC) over a single dedicated power conductor pair having a relatively larger diameter. Centralized bulk powering does not mandate a limit on the maximum power that can be transmitted over the conductors. This enables multiple remote loads that can be powered by just using a single conductor pair as opposed to multiple conductor pairs as in RFT-V. Consequently, the cost, weight, and the effective diameter of the conductors are significantly reduced, which is beneficial for both aerial and underground system installations. In addition, other advantages include the need for a lower number of power conversion devices, connectors, junction boxes, and surge protector fixtures.

SUMMARY

According to a first aspect, there is provided a system comprising: a first supply-side current sensor for measuring a first supply-side current entering a first conductor from a power supply; a first supply-side switch for adjusting a magnitude of the first supply-side current; a first remote-side switch for turning a first remote-side current on and off, wherein the first remote-side current enters a load from the first conductor; a pulse generator configured to generate a pulse width modulation signal for modulating the first remote-side switch to turn the first remote-side current on and off; and a fault management controller for communicating with the first supply-side current sensor and the first supply-side switch and configured to: determine that, at least for a duration threshold, the first supply-side current has met or exceeded a magnitude threshold; and then reduce the first supply-side current using the first supply-side switch such that the first supply-side current is less than the magnitude threshold.

The duration threshold may be at least as long as an on-time (Ton) of the pulse width modulation signal.

The fault management controller may comprise: first current signal qualifying circuitry comprising a first comparator configured to compare a magnitude of the first supply-side current to the magnitude threshold and output a first comparator output signal; and signal on-delay circuitry comprising an on-delay timer that is electrically coupled to the output of the first comparator and that is configured to output a fault signal when the first comparator output signal has indicated that the magnitude of the first supply-side current has exceeded the magnitude threshold for the duration threshold. The first supply-side current may be reduced in response to the first comparator signal indicating that the magnitude of the first supply-side current exceeds the magnitude threshold, and when the on-delay timer concurrently outputs the fault signal.

The on-delay timer may be configured to use as the duration threshold a value that varies in response to the magnitude of the first supply-side current.

The signal on-delay circuitry may further comprise a delay selector switch communicatively coupled to the on-delay timer, wherein the delay selector switch is movable between a constant delay state that causes the on-delay timer to use a constant value for the duration threshold, and an adaptive delay state that causes the on-delay timer to use as the duration threshold the value that varies in response to the magnitude of the first supply-side current.

The signal on-delay circuitry may further comprise timer delay period circuitry configured to determine the value that varies in response to the magnitude of the first supply-side current from a lookup table or formulaically based on the magnitude of the first supply-side current.

The system may further comprise a pulse current demodulator communicatively coupled to the first comparator to receive and demodulate the first comparator output signal.

The pulse generator may comprise: first pulse generation circuitry configured to output the pulse width modulation signal; and period generation circuitry communicatively coupled to the first pulse generation circuitry to set a period of the pulse width modulation signal. The period generation circuitry may comprise dynamic maximum period circuitry configured to determine the period based on a magnitude of the first remote-side current from a lookup table or formulaically.

The period generation circuitry may further comprise a period selector switch movable between a constant period state that outputs a fixed value for the period to the first pulse generation circuitry, and a dynamic period state that outputs the period as determined by the dynamic maximum period circuitry to the pulse generation circuitry.

The pulse generator may comprise: first pulse generation circuitry; second pulse generation circuitry comprising a data packet register communicatively coupled to a pulse current modulator; and an output selector switch operable to select an output of the first pulse generation circuitry or of the second pulse generation circuitry to be used as the output of the pulse generator.

The system may further comprise: a second supply-side current sensor for measuring a second supply-side current entering a second conductor from the power supply, wherein the first and second conductors are electrically coupled together in parallel; a second supply-side switch for adjusting a magnitude of the second supply-side current; and a second remote-side switch for turning a second remote-side current on and off, wherein the second remote-side current enters the load from the second conductor. The pulse generator may deliver interleaved power to the load by alternately switching the first and second remote-side switches on and off; and the fault management controller may also be for communicating with the second supply-side current sensor and the second supply-side switch, and be further configured to: determine that, at least for a duration threshold, the second supply-side current has met or exceeded the magnitude threshold; and then reduce the second supply-side current using the second supply-side switch such that the second supply-side current is less than the magnitude threshold while the first supply-side current is reduced below the magnitude threshold.

The fault management controller may comprise: first current signal qualifying circuitry comprising a first comparator configured to compare a magnitude of the first supply-side current to the magnitude threshold and output a first comparator output signal; second current signal qualifying circuitry comprising a second comparator configured to compare a magnitude of the second supply-side current to the magnitude threshold and output a second comparator output signal; and signal on-delay circuitry comprising a qualifying delay timer that is electrically coupled to outputs of the first and second comparators and that is configured to output a fault signal when the first and second comparator output signals both indicate that each of the magnitudes of the first and second supply-side currents have exceeded the magnitude threshold for the duration threshold. The first and second supply-side currents may be reduced in response to the qualifying delay timer outputting the fault signal.

The pulse generator may alternately switch the first and second remote-side switches on and off according to different phase shifts.

The system may further comprise: a second supply-side current sensor for measuring a second supply-side current entering a second conductor from the power supply, wherein the first and second conductors are electrically coupled together in parallel; a second supply-side switch for adjusting a magnitude of the second supply-side current; and a second remote-side switch for turning a second remote-side current on and off, wherein the second remote-side current enters the load from the second conductor. The pulse generator may deliver interleaved power to the load by alternately switching the first and second remote-side switches on and off; and the fault management controller may also be for communicating with the second supply-side current sensor and the second supply-side switch, and be further configured to permit the second supply-side current to exceed the magnitude threshold while the first supply-side current is reduced below the magnitude threshold.

The first supply-side switch may comprise part of the power supply, and the fault management controller may be configured to modulate the first supply-side switch to reduce the first supply-side current to a non-zero value.

The first supply-side switch may be opened to reduce the first supply-side current to zero.

According to another aspect, there is provided the use of any of the above aspects of the system or suitable combinations thereof to transmit data from the pulse generator to the fault management controller.

According to another aspect, there is provided a method comprising: measuring a first supply-side current flowing from a power supply into a first conductor, wherein the first conductor electrically couples the power supply to a load; delivering power to the load by modulating a first remote-side current on and off, wherein the first remote-side current enters the load from the first conductor; determining that, at least for a duration threshold, the first supply-side current has met or exceeded a magnitude threshold; and after the determining, reducing the first supply-side current such that the first supply-side current is less than the magnitude threshold.

The duration threshold may be at least as long as an on-time (Ton) of the pulse width modulation signal used to modulate the first remote-side current.

The method may further comprise determining the duration threshold based on a magnitude of the first supply-side current.

The duration threshold may be determined from a lookup table based on the magnitude of the first supply-side current, or formulaically based on the magnitude of the first supply-side current.

The method may further comprise demodulating a signal in the first supply-side current generated by modulation of the first receive-side current.

A pulse width modulation signal may be used to modulate the first remote-side current, and the method may further comprise determining a period of the pulse width modulation signal based on a magnitude of the first remote-side current.

The period of the pulse width modulation signal may be determined from a lookup table based on the magnitude of the first remote-side current, or formulaically based on the magnitude of the first remote-side current.

A pulse width modulation signal may be used to modulate the first remote-side current, and the pulse width modulation signal may be modulated so as to encode a signal therein.

A second conductor may also electrically couple the power supply to the load, and the delivering of the power to the load may also comprise modulating a second remote-side current that enters the load from the second conductor on and off so as to interleave the first and second remote-side currents, and the method may further comprise: determining that, at least for the duration threshold, the second supply-side current has met or exceeded the magnitude threshold; and then reducing the second supply-side current such that the second supply-side current is less than the magnitude threshold while the first supply-side current is reduced below the magnitude threshold.

The first and second remote-side currents may be modulated according to different phase shifts.

A second conductor may also electrically couple the power supply to the load, and the delivering of the power to the load may also comprise modulating a second remote-side current that enters the load from the second conductor on and off so as to interleave the first and second remote-side currents, and the method may further comprise permitting the second supply-side current to exceed the magnitude threshold while the first supply-side current is reduced below the magnitude threshold.

Reducing the first supply-side current may comprise modulating at least one switch such that the first supply-side current is reduced to a non-zero value.

Reducing the first supply-side current may comprise opening at least one switch to reduce the first supply-side current to zero.

According to another aspect, there is provided a method comprising: measuring a first supply-side current flowing from a power supply into a first conductor, wherein the first conductor electrically couples the power supply to a load; delivering power to the load by modulating a first remote-side current on and off, wherein the first remote-side current enters the load from the first conductor and wherein the modulating embeds a data signal in the first remote-side current that appears in the first supply-side current; and demodulating the data signal in the first supply-side current.

According to another aspect, there is provided a non-transitory computer readable medium having stored thereon computer program code that is executable by a processor and that, when executed by the processor, causes the processor to perform any of the above aspects of the method or suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Figure 1:
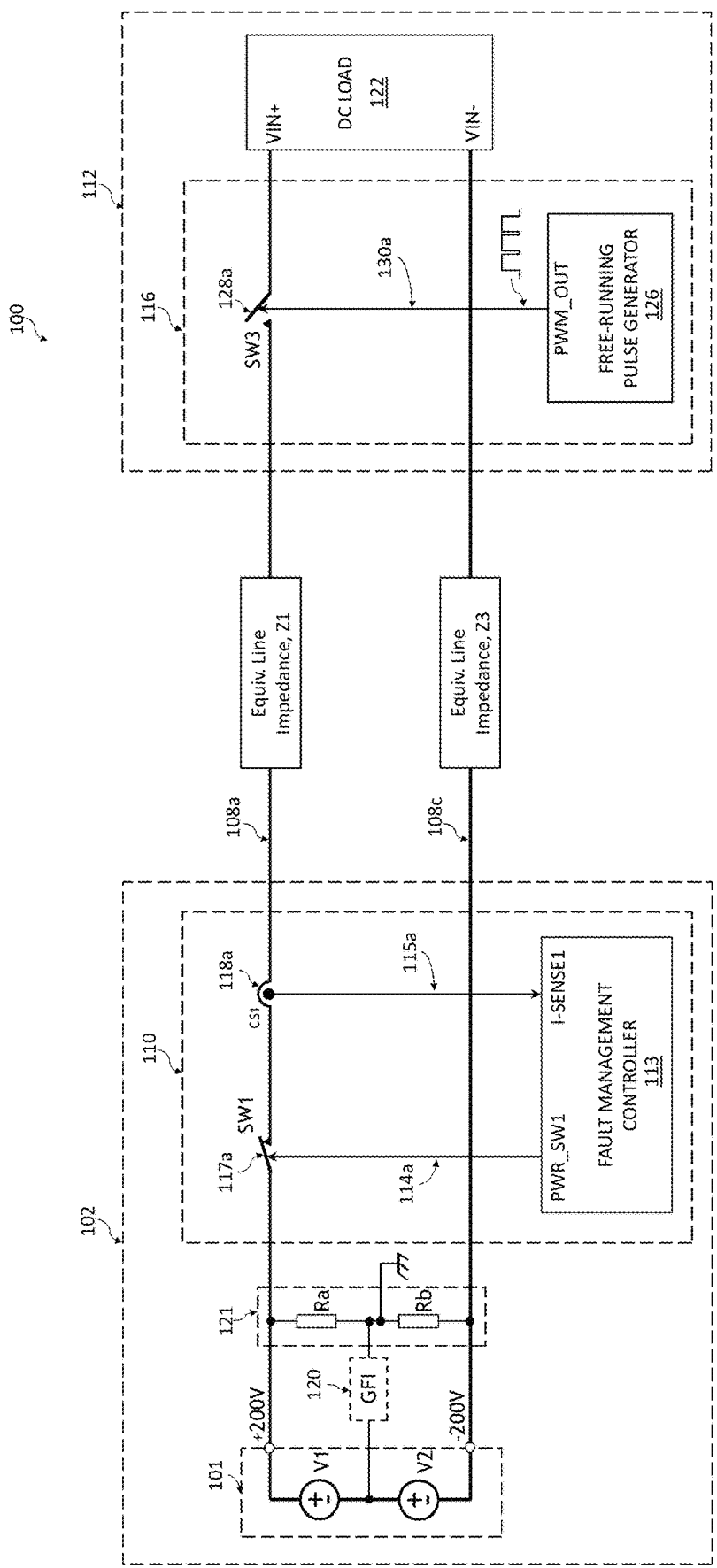
FIG. 1 is a block diagram of a fault-responsive power system using asynchronous load current switching, according to an example embodiment.

Generally speaking, in a high voltage DC power transmission system that uses centralized bulk powering one or more power supplies transmits high voltage electricity to one or more DC-to-DC power converters. The one or more DC-to-DC power converters convert the inbound electric power to a lower voltage suitable for powering a load electrically coupled to an output of the one or more DC-to-DC power converters. One or more live conductors acting as a power transmission line electrically couple the one or more power supplies to the one or more DC-to-DC power converters. Typical transmission distances span 200 ft (~60 m) to 8 kft (~2,400 m), for example. The currents entering the transmission line from the one or more power supplies are the "supply-side" currents, while the currents entering the one or more DC-to-DC power converters from the transmission line are the "remote-side" currents.

However, transmitting high voltage DC power poses a safety risk in that a person who inadvertently causes an electrical fault, such as by touching two different live conductors, may receive a serious electrical shock. Ideally, the supply-side currents are equal to the remote-side currents. However, if a person has caused an electrical fault along the transmission line, the supply-side and remote-side currents will differ as a result of a certain amount of current being conducted through the body of the person who caused the fault.

Various solutions to address the risk of electrical shock in high voltage DC power transmission systems have been proposed. For example, one solution uses supply-side and remote-side controllers to respectively independently monitor the supply-side and remote-side currents, and to communicate the remote-side current measurements from the remote-side controller to the supply-side controller. The supply-side controller compares the remote-side current measurement it receives to the supply-side current it measures. If the currents differ, the supply-side controller concludes a fault is present and can shut down power transmission. However, this solution requires a low-latency communication link to connect the two controllers, which can be practically problematic.

Another example solution also uses supply-side and remote-side controllers to respectively control a supply-side switch and a remote-side switch that, when both open, electrically isolate the transmission line. Pulsed power is delivered into the transmission line and when both switches are open and the transmission line isolated, the supply-side controller monitors the voltage decay on the transmission line. A decay rate that exceeds a predefined threshold indicates the presence of an electrical fault in response to which the supply-side controller can shut down power transmission. However, delivering pulsed power requires relatively large power conductors, which increases costs and is a relatively inefficient use of materials. Relying on monitoring voltage decay also makes this solution susceptible to parasitic capacitances and inductances.

Another example solution again uses supply-side and remote-side controllers to respectively control supply-side and remote-side switches. In normal operation, pulsed power is delivered from the supply-side to the remote-side by switching the remote-side switch on and off in synchronization with the signal coming from the supply-side controller. When the remote-side switch is off (i.e., no power is being delivered into the one or more power converters), the supply-side controller measures the magnitude of any supply-side current being delivered into the transmission line. If this current exceeds a predefined threshold corresponding to an expected residual amount of current, the supply-side controller concludes that the current is due to an electrical fault and discontinues power transmission by opening the supply-side switch. However, this solution again requires a low-latency communications link between the controllers so that the supply-side controller knows when the remote-side switch is open, and pulsed power delivery requires a relatively large power conductor with the corresponding drawbacks as described above.

A fourth solution again uses a supply-side controller and, instead of a remote-side switch, a current slope limiter. The current slope limiter draws power from the one or more power supplies, with the supply-side controller monitoring the supply-side current and controlling a supply-side switch that can be used to shut power off. The current slope limiter is configured to draw current according to a pre-defined ramp function having the same slope regardless of input and load dynamics. If current is drawn in excess of this ramp function, the supply-side controller concludes the excess draw is due to an electrical fault and shuts off the supply-side switch. However, this solution requires high precision sensor devices and precise calibration, since it can be challenging to distinguish between the pre-defined ramp function and an electrical fault in real-world operating conditions; require a 2-stage power conversion on the remote-side, as a pre-regulator is used for the current slope limiter in addition to the one or more DC-DC converters themselves; and is transient event dependent in that the current slope is only detectable at the moment the fault happens, regardless of the duration of the fault. This raises the risk that the event or transition may be missed in real-world operating conditions, particularly in the presence of strong background noise.

In contrast to the above solutions, the systems and methods described herein are directed at using asynchronous load current switching in order to handle faults. More particularly, power is transmitted from a power supply to a remote load in an interleaved or non-interleaved manner using one or more conductors that act as a transmission line. Current on any individual conductor is pulsed at a remote-side of a system comprising the load and a free-running pulse generator, and a fault management controller on a supply-side of the system comprising the supply-side current sensors that measure each of the currents entering the one or more conductors from the power supply. When any one of those currents has exceeded a certain magnitude ("magnitude threshold") for at least a certain duration ("duration threshold"), the fault management controller reduces and in at least some embodiments turns off power delivery. This allows a fault to be managed without synchronization between the supply-side and remote-side of the system.

Figure 4B:
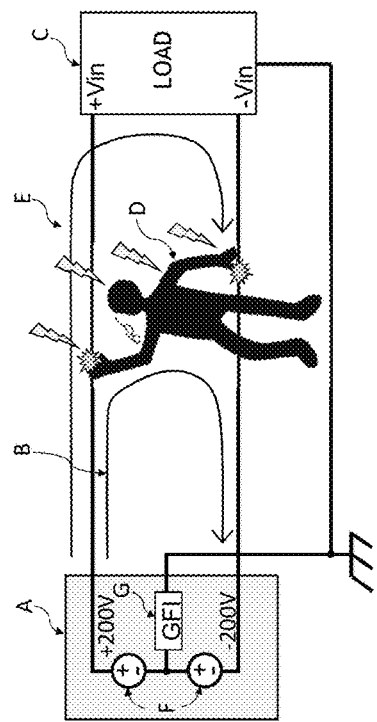
FIG. 4B depicts a flow of fault current for a scenario in which a person is touching two live conductors, according to the prior art.
Figure 4A:
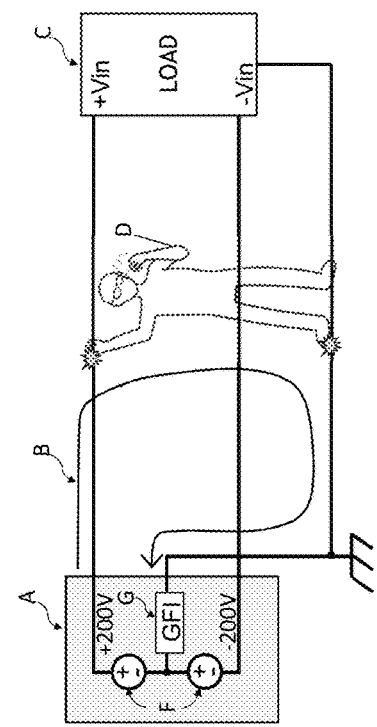
FIG. 4A depicts a flow of fault current for a scenario in which a person is touching a live conductor and ground, according to the prior art.

Referring first to FIGS. 4A and 4B, there are depicted in FIG. 4A a flow of fault current for a scenario in which a person is touching a live conductor and ground, and in FIG. 4B a flow of fault current for a scenario in which a person is touching two live conductors, both according to the prior art.

Each of FIGS. 4A and 4B depicts a power supply A that comprises a pair of voltage sources F electrically coupled in series. Each of the voltage sources F is 200 V, and the positive terminal of one of the voltage sources F is labeled at +200 V while the negative terminal of the other of the voltage sources F is labeled at −200 V. A ground fault interrupter ("GFI") G is electrically connected between the two sources F at 0 V to ground. A load C is electrically coupled to the +200 V and −200 V terminals of the power supply A and to ground.

In FIG. 4A, a person D commits a "line-to-ground fault" by touching their hand to the +200 V transmission line and their foot to ground. However, by virtue of the GFI G, body current B briefly flows from the +200 V terminal to the GFI G, which then detects and interrupts the current flow by turning off the voltage sources (control circuit not shown) and thereby prevents the person D from experiencing a serious electrical shock.

In contrast, in FIG. 4B the person D causes a line-to-line fault by touching the +200 V and −200 V conductors with their hands. This bypasses the GFI G, and consequently the line-to-line fault does not result in current interruption. The power supply A continues to supply a load current E even during the fault, and the body current B traveling through the person D can result in a serious electrical shock.

This problem is averted using, for example, an example embodiment of a fault-responsive power system 100 such as that depicted in the block diagram of FIG. 1. In FIG. 1, a power transmitter 102 is used to deliver power to a remote unit 112 via a first conductor 108a that electrically couples positive terminals of the of the power transmitter 102 and remote unit 112 together, and via a third conductor 108c that electrically couples negative terminals of the power transmitter 102 and remote unit 112 together.

The remote unit 112 comprises a free-running pulse generator 126, a load 122, and a first remote-side switch 128a. The first remote-side switch 128a is positioned along the first conductor 108a so that when the first remote-side switch 128a is open, current entering the load 122 from the first conductor 108a ("first remote-side current") is stopped and so that when the first remote-side switch 128a is closed, the first remote-side current may enter the load 122. The first remote-side switch 128a may comprise, for example, a power MOSFET, BJT, IGBT, or solid-state relay. The pulse generator 126 outputs a first remote-side switch control signal 130a, which is a pulse width modulation ("PWM") signal in FIG. 1. The PWM signal is for modulating the first remote-side switch 128a to turn the first remote-side current on and off according to the duty cycle and period of the PWM signal as discussed further below. The load 122 in FIG. 1 is a DC load, although as discussed further below in respect of FIG. 3 the load 122 may alternatively be an AC load.

The power transmitter 102 comprises a power supply 101, which itself comprises two voltage sources V1 and V2 electrically coupled in series. The voltage difference across the power supply 101 is 400 V, with the power supply's 101 positive terminal at +200 V, the power supply's 101 negative terminal at −200 V, and the midpoint between the two voltage sources V1 and V2 being 0 V. This configuration is commonly referred to as bipolar or split power sources. To provide protection from a line-to-ground fault, a High Resistance Midpoint Ground ("HRMG") circuit 121 is added in the system (detection and control circuit not shown) and is electrically coupled across the power supply 101. A midpoint of the HRMG system 121 between impedances Ra and Rb is electrically shorted to ground. Alternatively, a Ground Fault Interrupter ("GFI") circuit 120 can also be used in lieu of HRMG that provides similar line-to-ground fault protection. The GFI circuit (control circuit not shown) is electrically connected in series between the 0 V midpoint and ground. The choice of using either the HRMG circuit 121 or the GFI circuit 120 is heavily dependent on the type of system application and other electrical safety considerations.

The power transmitter 102 also comprises a fault sensing and management circuit 110. The fault sensing and management circuit 110 comprises a first supply-side switch 117a positioned along the first conductor 108a so that when the first supply-side switch 117a is closed, current can leave the power supply 101 and enter the first conductor 108a (this current is the "first supply-side current") and, when the first remote-side switch 128a is closed, power the remote unit 112. Alternatively, the first supply-side switch 117a may be held open for a sufficiently long period of time to shut off the first supply-side current, or modulated to reduce the first supply-side current to a non-zero value less than the magnitude threshold. The fault sensing and management circuit 110 also comprises a first supply-side current sensor 118a that is positioned along the first conductor 108a to measure the first supply-side current.

The fault sensing and management circuit 110 also comprises a single channel fault management controller 113. The fault management controller is communicatively coupled to each of the first supply-side switch 117a and the first supply-side current sensor 118a. The fault management controller 113 controls the first supply-side switch 117a using a first supply-side switch control signal 114a, and receives the value of the first supply-side current from the first supply-side current sensor 118a via a first supply-side current signal 115a.

In normal operation when there is no fault, the first supply-side switch 117a is always closed and the first remote-side switch 128a is switched opened and closed by the PWM signal from the pulse generator 126. This results in power being delivered from the power supply 101 to the load 122 via current pulses without removing the supply voltage from the first conductor 108a, which acts as a transmission line. This helps the system 100 handle any variation of capacitance in the transmission line as opposed to alternatives in which parasitic capacitance may affect system reliability if not handled properly by controlling the effective parasitic capacitance of the transmission line itself or adopting some sort of quick discharge mechanism during fault-testing.

The pulse generator 126 is "free-running" in that it generates the PWM signal independently of the power transmitter 102. In other words, controlling the first remote-side switch 128a does not require any synchronization with the supply-side such as with the fault management controller 113, which is in contrast to the prior art in which synchronization of both the supply-side and remote-side switches is strictly required.

As mentioned above, during non-fault or normal state operation power is delivered in pulses from the power transmitter 102 to the load 122 by virtue of the first remote-side switch 128a being opened and closed by the first remote-side switch control signal 130a. This consequently causes pulses in the remote-side and supply-side currents, which are equal to each other in normal operation. The load 122 usually has an input filter circuit that is designed to average the pulsating current it receives in order to obtain stable power. The load 122 may, for example, comprise a DC-DC power converter that has internal input capacitors to handle the pulsating current.

Figure 12:
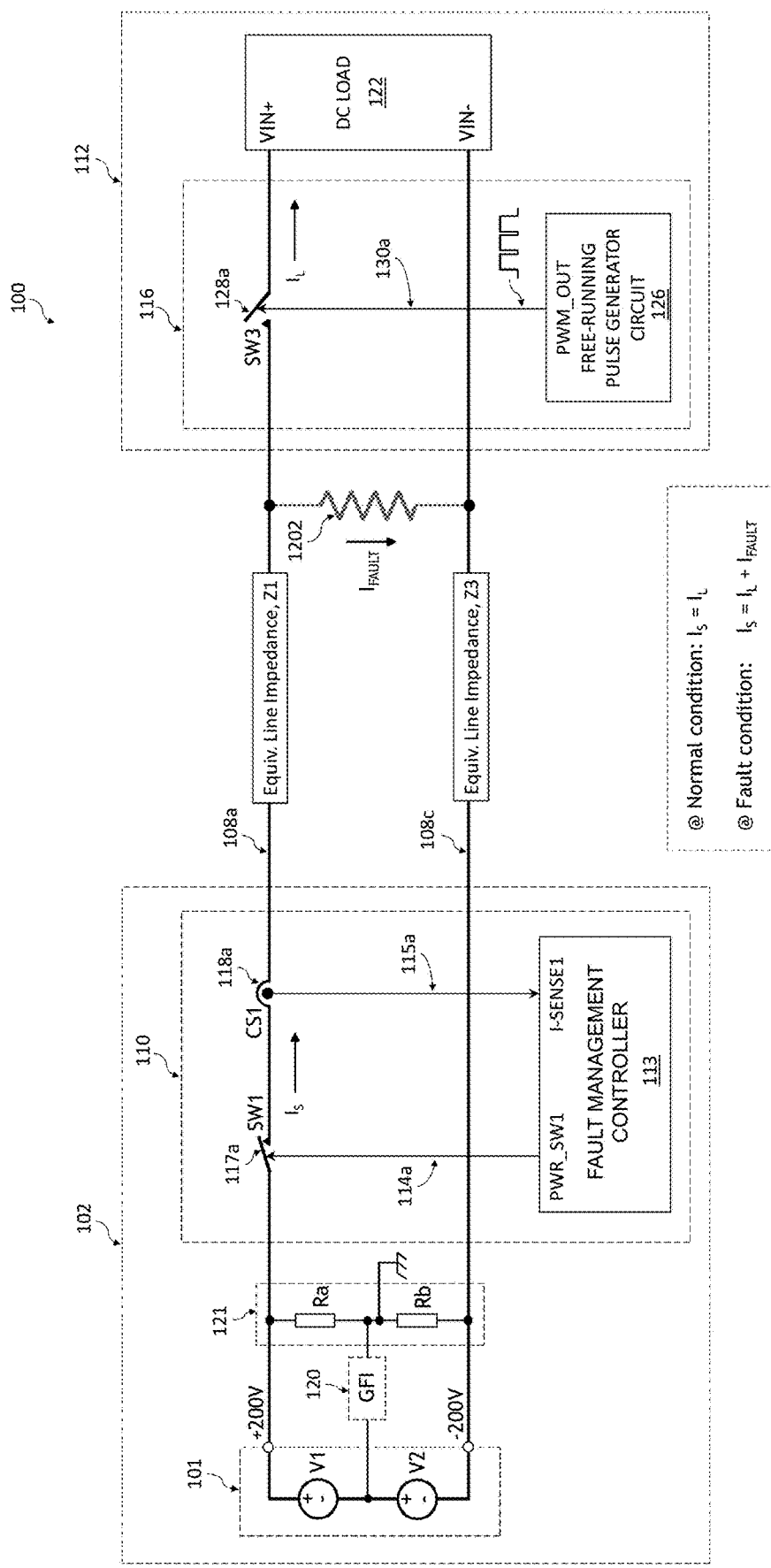
FIG. 12 is a block diagram of the system of FIG. 1 depicting the flow of line currents and their relationship to one another in the presence of a line-to-line fault caused by an external foreign body with certain impedance, according to an example embodiment.

FIG. 12 is a block diagram of the system 100 of FIG. 1 depicting the flow of line currents and their relationship to one another in the presence of a line-to-line fault caused by an external foreign body 1202 with certain impedance, such as a person. In FIG. 12, $I_S$ represents the first supply-side current, $I_L$ represents the first remote-side current, and $I_{FAULT}$ represents the fault current traveling through the external foreign body 1202 from the first conductor 108a to the third conductor 108c. In normal operation where there is no fault and consequently $I_{FAULT}$ is zero, $I_S=I_L$ as mentioned above in respect of FIG. 1. However, when a fault is present, $I_S=I_L+I_{FAULT}$. In particular, when the first remote-side switch 128a is open and $I_L$ is zero, $I_{FAULT}$ is nonetheless non-zero when a fault is present.

Figure 7:
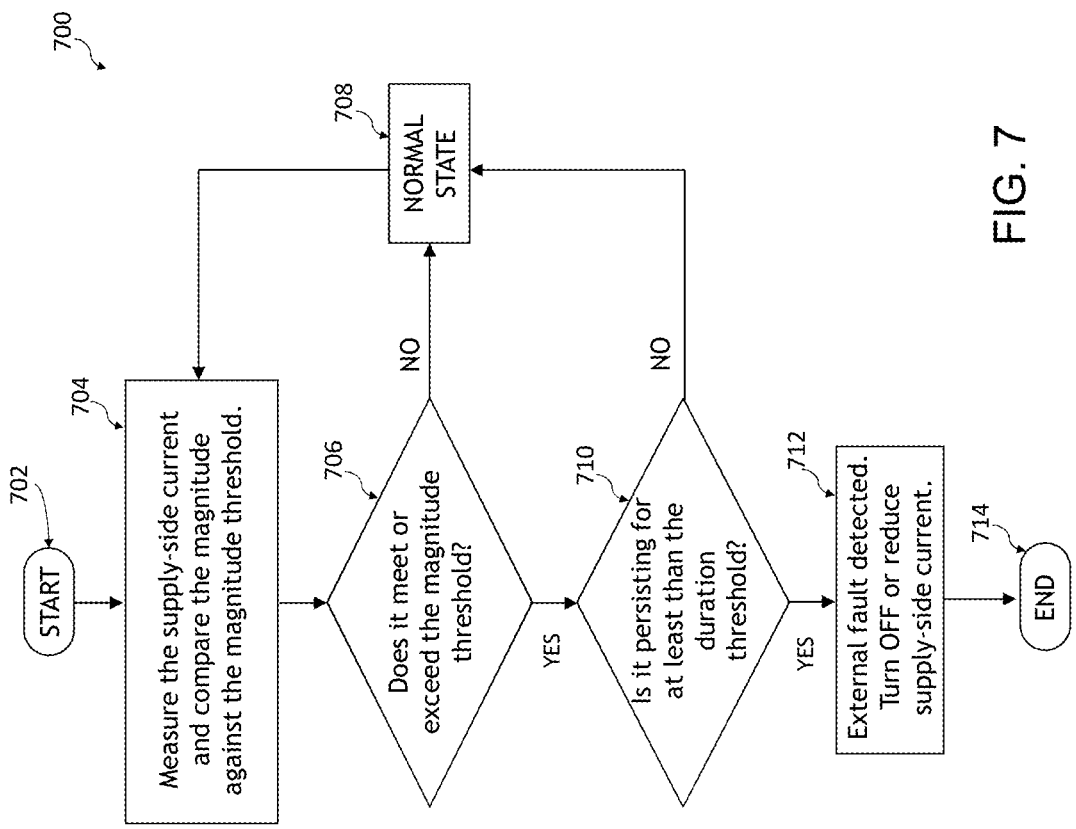
FIG. 7 is a flowchart illustrating a method applied by the fault management controller comprising part of the system of FIG. 1 showing how the fault management controller responds during both normal and fault states, according to an example embodiment.

FIG. 7 depicts a flowchart illustrating a method 700 applied by the fault management controller 113 of the system 100 of FIG. 1, showing how the fault management controller 113 responds during both normal and fault states. This method 700 of FIG. 7 may be expressed as computer program code and stored in a memory comprising part of the fault management controller 113. A processor, also comprising part of the fault management controller 113 and communicatively coupled to the memory, may execute the computer program code to cause the fault management controller 113 to perform the method 700 of FIG. 7. Alternatively, the fault management controller 113 may be alternatively implemented, for example as depicted in FIG. 5, described below.

In FIG. 7, the method 700 starts at block 702 and proceeds to block 704 where the fault management controller 113 measures the first supply-side current on the first conductor 108a using the first supply-side current sensor 118a. The fault management controller 113 receives the value of the first supply-side current via the first supply-side current signal 115a. The fault management controller 113 compares the magnitude of the first supply-side current to the magnitude threshold, whose value is selected as described further in respect of FIG. 6 below.

At block 706, the fault management controller 113 determines whether the first supply-side current's magnitude exceeds the magnitude threshold. If it does not, the fault management controller 113 proceeds to block 708 where it concludes the system 100 is operating in a normal (i.e., non-fault) state, and returns to block 704. However, if the first supply-side current's magnitude does exceed the magnitude threshold, the fault management controller 113 proceeds to block 710 to determine whether this has persisted for at least the duration threshold. The value selected for the duration threshold is described further in respect of FIG. 6, below. The effect of the fault management controller 113 determining that the first supply-side current satisfies blocks 706 and 710 is a determination that, at least for a duration threshold, the first supply-side current has met or exceeded a magnitude threshold. Consequently, the fault management controller 113 proceeds to block 712 where it sends the first supply-side control signal 114a to the first supply-side switch 117a to shut off the first supply-side current or reduce the power supply output through switch modulation such that the first supply-side current is less than the magnitude threshold. The fault management controller 113 then proceeds to block 714, where the method 700 ends.

Figure 5:
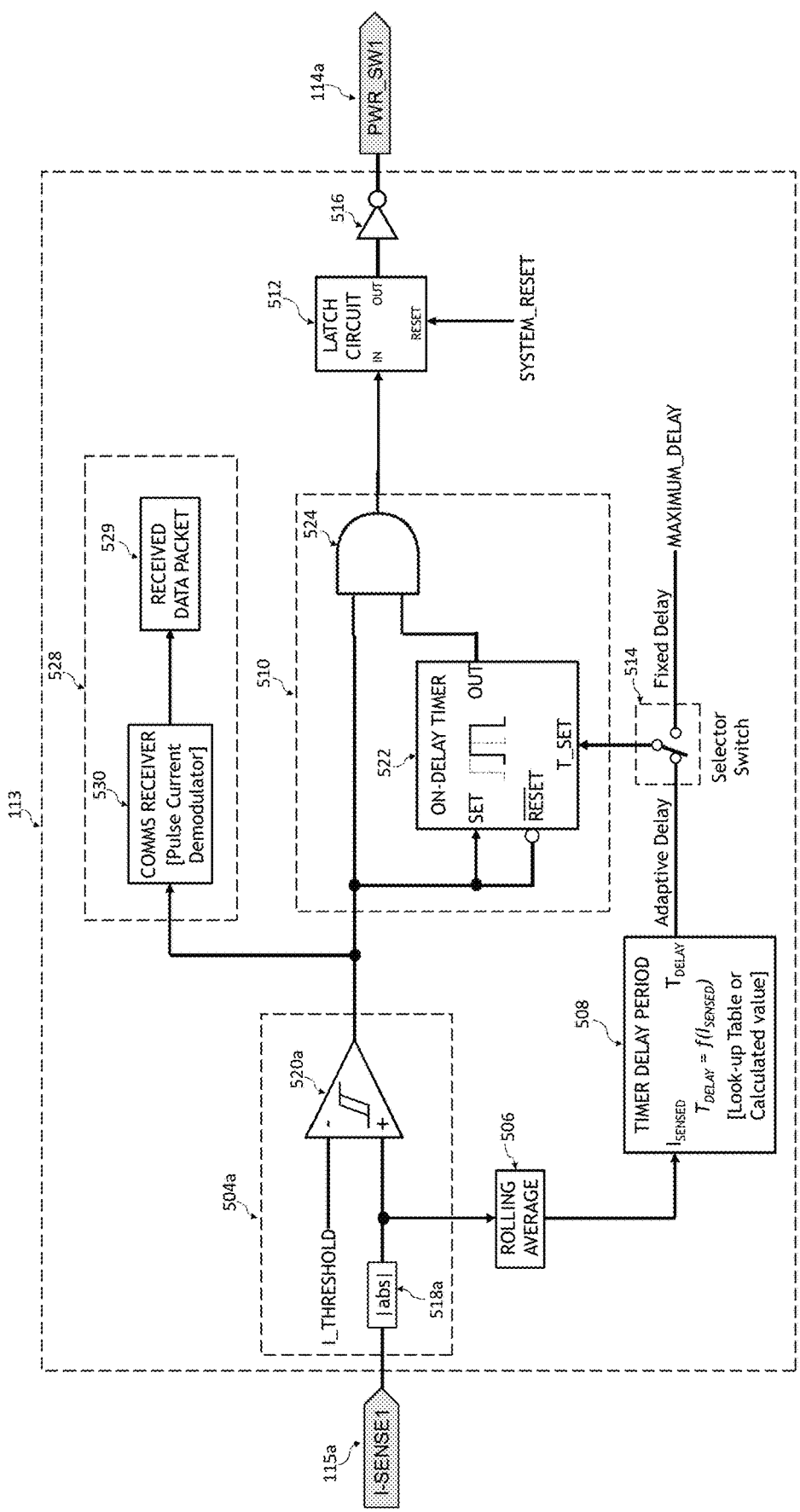
FIG. 5 is a block diagram of a logic circuit implementation of a fault management controller comprising part of the system of FIG. 1, according to the main embodiment.

FIG. 5 is a block diagram of a logic circuit implementation of the fault management controller 113 comprising part of the system 100 of FIG. 1, according to an example embodiment. In FIG. 5, the fault management controller 113 receives as input the first supply-side current signal 115a at the terminal labeled I-SENSE1 from the first supply-side current sensor 118a. The current signal 115a is sent to first current signal qualifying circuitry 504a. This functionality may be implemented digitally using, for example, a microcontroller or digital signal processor, or using analog circuitry such as an op-amp.

The first current signal qualifying circuitry 504a comprises first absolute value processing circuitry 518a that determines the absolute value of the current signal 115a, and outputs the magnitude of the first supply-side current signal 115a to the positive terminal of a first comparator 520a. A signal labeled I_THRESHOLD in FIG. 5, which corresponds to the magnitude threshold, is input to the negative terminal of the first comparator 520a. The output of the first comparator 520a is driven high if the first supply-side current signal 115a exceeds the magnitude threshold and is otherwise driven low.

The first comparator's 520a output is sent to signal on-delay circuitry 510. In particular, the first comparator's 520a output restarts an on-delay timer 522 that drives its output high when the duration threshold has passed. The on-delay timer 522 uses an internal signal to determine when the duration threshold has passed, as depicted and described in respect of FIGS. 13, 15, and 16 below. The first comparator's 520a output and the on-delay timer's 522 output are both input to an AND gate 524. Consequently, only when both the first comparator's 520a output is high (indicating that the first supply-side current signal 115a exceeds the magnitude threshold) and the on-delay timer's 522 output is high (indicating that the first supply-side current signal 115a has exceeded the magnitude threshold for at least the duration threshold) is the output of the AND gate 524 high. The output of the AND gate 524 is used as the output of the signal on-delay circuitry 510 and acts as a "fault signal" that is the basis of the first supply-side switch control signal 114a. More particularly, the fault signal is input to a latch circuit 512, which drives an inverter 516. The output of the inverter 516 is driven low in response to the high fault signal, and the inverter's 516 output is used as the first supply-side switch control signal 114a. The output of the latch circuit 512 remains asserted until the system 100 and consequently also the latch circuit 512 is reset using the SYSTEM_RESET signal.

The value of the duration threshold applied by the on-delay timer 522 is determined by the signal applied to its T_SET input by a delay selector switch 514. The delay selector switch 514 is movable between a first state in which it sets the T_SET input to a fixed delay (i.e., a preset delay value) and a second state in which it sets the T_SET input to an adaptive delay. The fixed delay is set to a maximum safe delay corresponding to the MAXIMUM_DELAY signal of FIG. 5. As discussed further in respect of FIG. 6 below, the maximum safe delay is typically set to between 5 ms to 10 ms or lower.

The adaptive delay is determined using timer delay period circuitry 508 that is electrically coupled to the output of the first absolute value processing circuitry 518a to receive the magnitude of the first supply-side current. More particularly, in the embodiment of FIG. 5 the absolute value of the first supply-side current signal 115a is input to rolling average process circuitry 506 (as an alternative to a rolling average, a sliding window may be used, or alternatively the rolling average process circuitry 506 may be omitted) that determines a rolling average of the first supply-side current signal 115a over a pre-determined averaging window; this helps to smooth out noise in the first supply-side current signal 115a current signal. The rolling average is used as input to the timer delay period circuitry 508, which may determine the duration threshold using, for example, a lookup table indexed by the magnitude of the first supply-side current, or by performing a calculation at runtime based on the first supply-side current, as discussed further in respect of FIG. 6 below.

Figure 6:
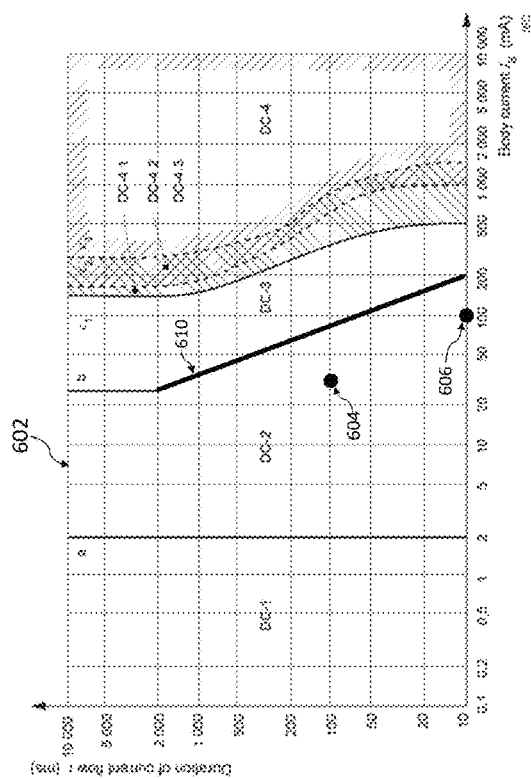
FIG. 6 illustrates a graph of different regions that are categorized into safe and un-safe zones according to the IEC 60479-1 standard as well as a table that shows the relationship between body current and allowable maximum duration.

Referring now to FIG. 6, there is shown a graph 602 of fault current vs. maximum allowable current flow duration time that includes different regions that are categorized into safe and un-safe zones according to the IEC 60479-1 standard, as well as a table 608 that shows the relationship between body current and allowable maximum duration. The maximum allowable duration may be used as, or as a basis for determining, the duration threshold.

Zones DC-1 and DC-2 of the graph 602 are categorized as safe regions and define the preferred operating zones for the system 100. DC-3 is the boundary between safe and un-safe regions, and this operating zone is preferentially avoided by the system 100. DC-4 is an un-safe or dangerous operating zone.

In at least some embodiments, the fault management controller 113 determines the actual value of any fault current, as opposed to other values used only as a proxy for the fault current (e.g. voltage decay, a different test voltage, change in current over time, etc.). The ability to quantifiably measure the magnitude of the fault current permits the system to implement a relatively resilient protection method using a variable or adaptive reaction time for the duration threshold. In certain situations, the ability to vary the duration threshold increases system reliability.

Points 604 and 606 respectively show examples of fixed maximum allowable duration times given a particular fault current. For example, point 604 shows a maximum allowable duration of no more than 100 ms for a magnitude threshold of 30 mA, while point 606 shows a maximum allowable duration of no more than 10 ms for a fault current of 100 mA. In prior art systems, which do not directly measure fault current or do not have a mechanism to quantify the actual fault current, the most common approach is to shut off current within 5-10 ms of detecting a fault, regardless of the magnitude of the fault current; this corresponds to the shortest time in the DC-2 region regardless of the detectable fault current. The problem with this approach is that it makes the protection circuit very sensitive and prone to false-positive or nuisance tripping. This is particularly problematic in outdoor installations where the power distribution system itself is subject to different noise transients in the field and other real-world electro-mechanical events such as ground potential rise, inductive coupling with other electrical conductors in proximity, and lightning surge transients. In the context of line powering in an outside plant ("OSP"), the spurious noise and line transients are magnified at light load conditions when the power transmission line is under-damped. An under-damped power transmission line does not easily suppress transient noise. Therefore, it makes sense to increase the fault qualifying time at no load or light load conditions to increase the likelihood that the fault event is valid and not just induced by any incidental noise as described above. If the power system does not have the ability for its protection system to have an adaptive duration threshold as a function of fault current, then practically the protection circuit must always be designed for worst-case scenario, which is the shortest reaction time possible in order to guarantee compliance with safety standards. This limitation is alleviated and addressed by permitting a dynamic duration threshold, such as discussed above in respect of FIG. 5.

In other words, by being able to closely quantify the magnitude of fault current, the duration threshold can be made more flexible, adaptive, or dynamic as set out in the corresponding current-time table 608. The maximum timer delay period of the table 608, which effectively corresponds to the duration threshold, is calculated as a function of the measured body fault current and is defined by the slope 610, which corresponds to operation in the DC-2 zone.

There are two ways in which the system 100 may be configured to use a dynamic duration threshold in response to particular operating conditions. The first approach is by using a lookup table as set out in the "Static Value [Lookup Table]" column of the table 608. This method provides a simpler design implementation for the control circuit; however, the resolution of the current-time parameters is dependent on the granularity or number of the terms in the lookup table.

The second approach is by calculating the duration threshold at run-time based on the following pre-defined equation: $T_{DELAY}=7.293\times10^{6}*(I_{SENSED})^{-2.548}$. This returns a continuous value for use as the duration threshold as a function of the sampled current $I_{SENSED}$ discussed above in respect of FIG. 5. While evaluating this equation at runtime provides more granularity, it also consumes more resources from the controller in terms of processing power, memory, etc. The practical consequences of this downside can be mitigated using relatively fast and high-memory processing circuitry capable of floating-point operation, such as a suitable microcontroller ("MCU") or digital signal processing ("DSP") chips. Alternative embodiments may use a different and still suitable formula for determining $T_{DELAY}$; for example, a fixed offset may be added to $I_{SENSED}$ to ensure a safety margin, the equation may be determined using a different value for the slope 1010 (for example if an AC current signal is being used), and/or an application-specific formula may be used.

In brief, if the measured fault current is lower, then the duration threshold can be made longer while still meeting the safe operating zone. On the other hand, if the measured fault current is higher, then the duration threshold is made shorter in order to reduce the hazardous condition of potential prolonged exposure in case of accidental contact from a person. An advantage of permitting an adaptive or dynamic duration threshold is that it makes the system 100 more resilient, robust, and flexible across a wider range of different applications.

As discussed further below in respect of FIGS. 11, 20, and 21, the pulse generator 126 may embed a data signal in the first remote-side current that appears in the first supply-side current and that can consequently be demodulated. In FIG. 5, demodulator circuitry 528 that receives the output of the first comparator 520a performs this demodulation. More particularly, the output of the first comparator 520a is input to a communications receiver 530 in the form of a pulse current demodulator or any circuit with equivalent function, which demodulates the data signal embedded in the first supply-side current. The communications receiver 530 outputs a data packet from the data signal, which is stored in a register 529. Absent synchronization between the communications receiver 530 and the pulse generator 126 and as discussed in respect of FIG. 20 below in particular, the communications receiver 530 waits for a pre-determined START bit to appear in the first supply-side current and, when it does, the communications receiver 530 demodulates the succeeding data package and stores it in the register 529 for further handling and processing.

Figure 11:
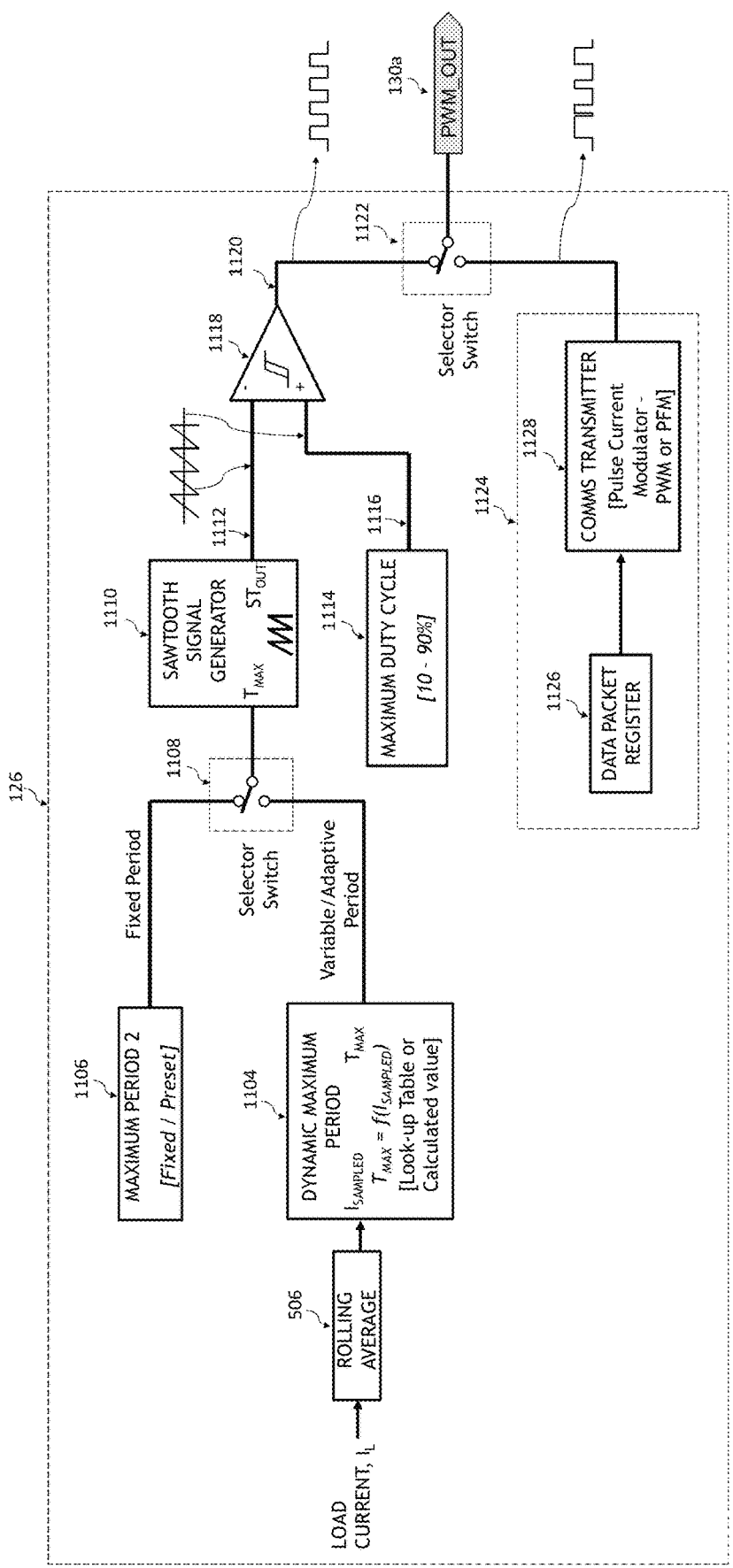
FIG. 11 is a block diagram of a logic circuit implementation of a pulse generator comprising part of the system of FIGS. 1-3, according to an example embodiment.

Referring now to FIG. 11, there is shown a block diagram of a logic circuit implementation of the pulse generator 126 according to an example embodiment; the logic circuit may be implemented digitally using, for example, a microcontroller or digital signal processor. The output of the pulse generator 126 is the first remote-side switch control signal 130a, which is output to the PWM_OUT terminal in FIG. 11. The output of the pulse generator 126 is selected by an output selector switch 1122, which is operable to select an output of first pulse generation circuitry or of second pulse generation circuitry 1124 to be used as the output of the pulse generator 126.

The first pulse modulation circuitry generates a PWM signal and comprises the rolling average process circuitry 506, dynamic maximum period circuitry 1104, fixed maximum period circuitry 1106, a period selector switch 1108, a sawtooth signal generator 1110, maximum duty cycle circuitry 1114, and a comparator 1118. The sawtooth signal generator 1110 outputs a sawtooth signal 1112, and the maximum duty cycle circuitry 1114 outputs a DC offset 1116 whose value allows adjustment of the PWM signal duty cycle from 10% to 90%. While FIG. 11 shows the duty cycle ranging from 10% to 90%, different ranges may be alternatively selected. The sawtooth signal 1112 is output to a negative terminal of the comparator 1118, the DC offset 1116 is output to a positive terminal of the comparator 1118, with the output signal 1120 consequently being a PWM signal.

The sawtooth signal generator 1110 has a $T_{MAX}$ input that can be used to adjust the period of the sawtooth signal 1112. The $T_{MAX}$ input receives the output of the period selector switch 1108. The period selector switch 1108 is movable between a constant period state that outputs a fixed value for the period to the first pulse generation circuitry that is obtained from the fixed maximum period circuitry 1106, and a dynamic period state that outputs the period as determined by the dynamic maximum period circuitry 1104. The dynamic maximum period circuitry 1104 receives as input a load current signal, which represents the magnitude of the total current entering the load 122 ("load current $I_L$"). In FIG. 1, this is equivalent to the first remote-side current. The rolling average process circuitry 506 determines a rolling average of the load current $I_L$ and outputs it to the dynamic maximum period circuitry 1104, which determines the period based on a lookup table indexed by the magnitude of the load current $I_L$, or by performing a calculation at runtime based on the load current $I_L$ such as described above in respect of FIG. 6. While not depicted in FIG. 11, a load current sensor measures the load current $I_L$ and delivers the magnitude of the load current $I_L$ to the rolling average process circuitry 506.

The second pulse generation circuitry 1124 comprises a register 1126 for a data packet that outputs a data packet to a communications transmitter 1128 such as a pulse current modulator that outputs a PWM signal that may be modulated in any suitable fashion, such as by using pulse frequency modulation ("PFM"). The communications transmitter 1128 modulates the data packet and, if selected by the output selector switch 1122, transmits the modulated signal to the fault management controller 113.

The output selector switch 1122 can accordingly be used to transfer power to the load 122 without encoding a data signal in the first remote-side current for subsequent demodulation by the fault management controller 113, in which case the output selector switch 1122 is set to output the PWM signal from the first pulse generation circuitry. Alternatively, the output selector switch 1122 can be set to output the signal from the second pulse generation circuitry 1124 to encode a data signal in the first remote-side current.

Figure 13:
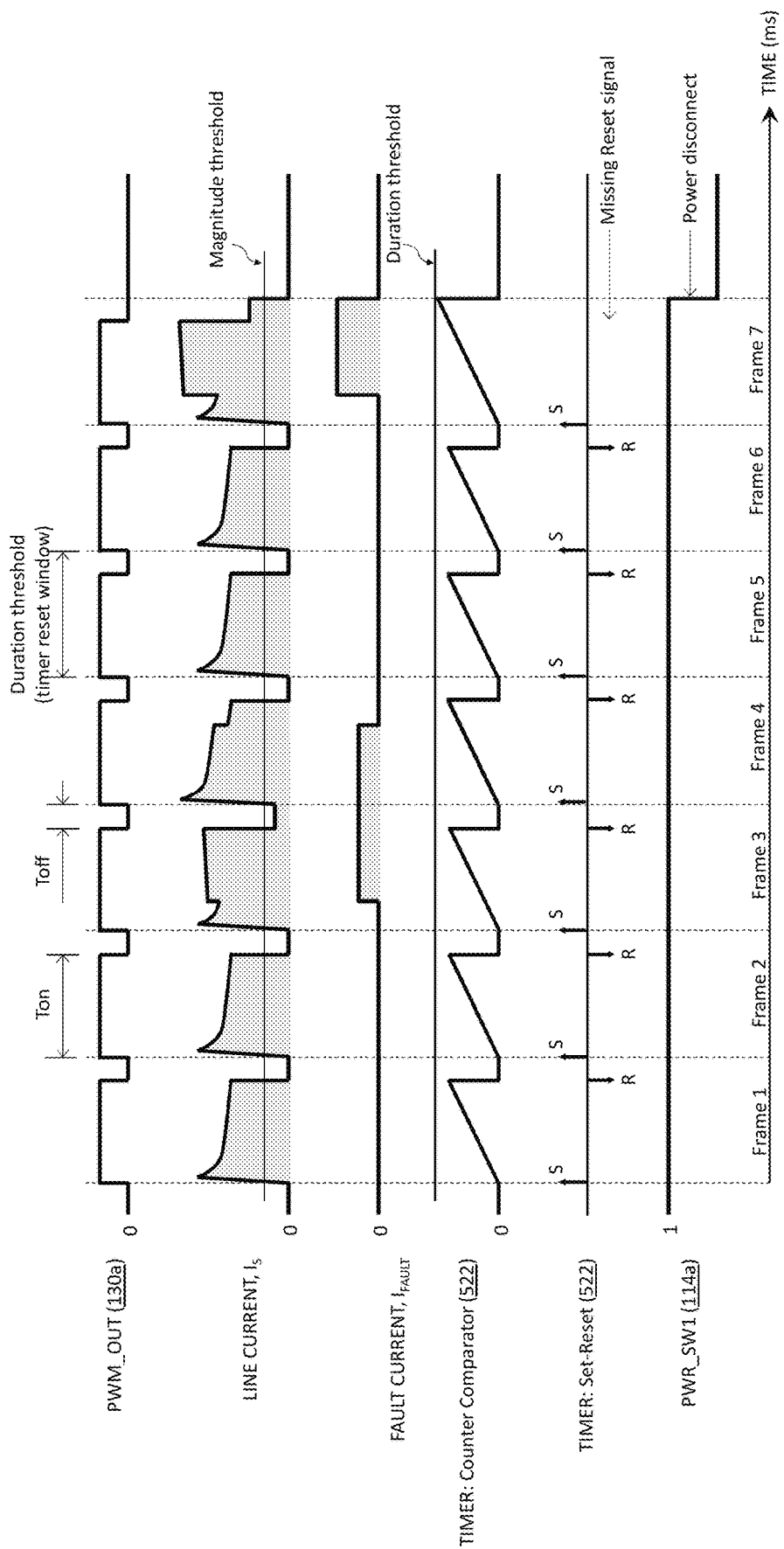
FIG. 13 is a timing diagram illustrating a timing sequence of selected signals, parameters, and the fault response of both the fault management controller and a power conditioning system comprising part of the system of FIG. 12, according to an example embodiment.

Referring now to FIG. 13, there is depicted a timing diagram illustrating a timing sequence of selected signals, parameters, and the fault response of both the fault management controller 113 and power conditioning system 116 comprising part of the system 100 of FIG. 12, according to an example embodiment. In FIG. 13, $I_S$ and $I_{FAULT}$ are respectively the first supply-side current and the fault current as depicted in FIG. 12, the PWM_OUT signal is the first remote-side switch control signal 130a, the PWR_SW1 signal is the first supply-side switch control signal 114a, the "TIMER: Counter Comparator" signal shows the internal signal used by the on-delay timer 522 to determine when the duration threshold has passed, and the "TIMER: Set-Reset" signal shows when the on-delay timer's 522 internal counter is set using an active high signal at the SET input shown in FIG. 5, and when the on-delay timer's 522 internal counter is reset using an active low signal at the RESET input shown in FIG. 5.

In FIG. 13, the first remote-side switch control signal 130a is generated by the pulse generator 126 that outputs a PWM signal having a duty cycle corresponding to the pre-set Ton 171 and Toff 172 shown in FIG. 13. In this example, Ton is chosen to be about 90% of the maximum period and Toff is accordingly chosen to be about 10% of the maximum period. The power conditioning system 116 is designed such that the maximum duration of Ton 171 is always less than the duration threshold; even if a dynamic value for both Ton 171 and the duration threshold is implemented as a function of load and line currents respectively, the duration threshold is still selected to be greater than the permitted maximum value of Ton.

When the first remote-side switch 128a device is closed and the remote-side current is flowing, the load 122 starts drawing current from the power supply 101 via the first conductor 108a. When the first remote-side switch 128a device is open, no current flows to the load 122. When the system 100 is not experiencing a line-to-line fault, the interrupted load current $I_L$ (equivalent to the first remote-side current) is also the same as the line current $I_S$ (equivalent to the first supply-side current) that is seen at the supply-side.

When the line current $I_S$ crosses the magnitude threshold, it sets the on-delay timer 522, which starts the on-delay timer's 522 internal counter. When IS falls below the magnitude threshold, the on-delay timer 522 is reset. This is shown in FIG. 13 in Frames 1 to 6.

If a fault is present but the magnitude of fault current $I_{FAULT}$ is not high enough to cause the total line current $I_S$ to exceed the magnitude threshold level for at least the duration threshold, then the fault does not affect the operation of the system 100. The on-delay timer 522 is still controlled mainly by the line current $I_S$ and is reset when the line current $I_S$ falls below the magnitude threshold, as shown in Frames 3 and 4.

Figure 22:
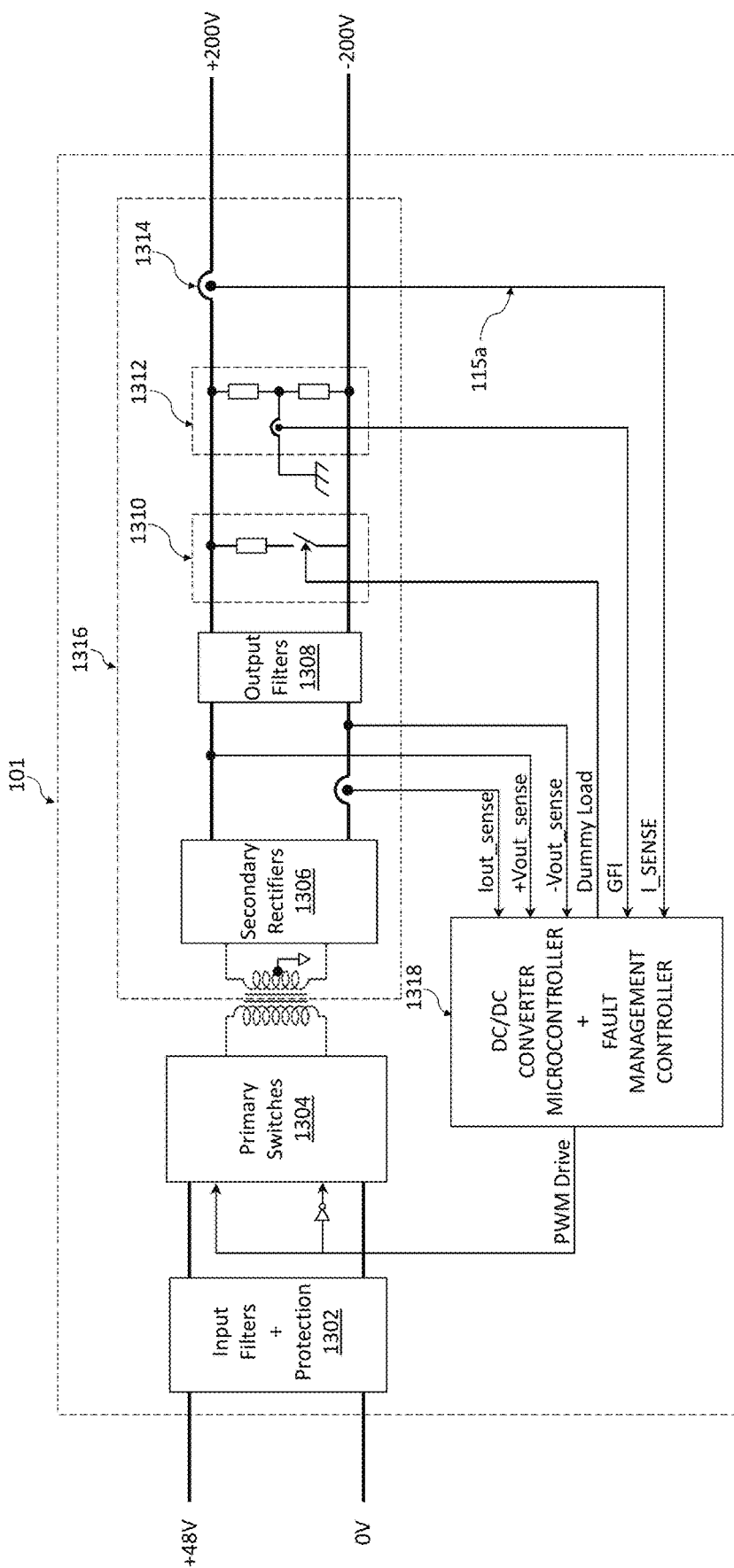
FIG. 22 is a block diagram of a power supply that may be used in the system of FIG. 1, according to an example embodiment.

When the fault current $I_{FAULT}$ exceeds the magnitude threshold continuously for at least as long as the duration threshold, a different response mode is triggered. As shown in Frame 7, the line current $I_S$ is expected to come down below the magnitude threshold when a fault is absent. However, because in Frame 7 a fault is present, the contribution of the fault current $I_{FAULT}$ 317 in addition to the first remote-side current prevents the on-delay timer 522 from resetting since the line current $I_S$ is kept at or above the magnitude threshold for at least the duration threshold. While the line current $I_S$ is above the magnitude threshold and prior to the line current $I_S$ being shut off or reduced to less than the magnitude threshold, the on-delay timer's 522 internal counter keeps on incrementing until it meets the duration threshold. Consequently, as shown in Frame 7 the on-delay timer 122 is not reset prior to the duration threshold being satisfied, the output of the AND 524 gate is driven high, the latch circuit 512 is triggered, and the first supply-side switch control signal 114a is driven low, which opens the first supply-side switch 117a and shuts off the line current $I_S$ at the end of Frame 7 Alternatively, if a power supply having an integrated fault management controller 113 is used as depicted in FIG. 22, the line current $I_S$ can be reduced to a lower value instead of completely shutting it off. To do this, the switching operation of the primary switches 1304 can also be modulated in accordance with a corresponding PWM Drive signal to reduce the differential output of V1 and V2 to a safe level (e.g., 60 V or less) in response to the first supply-side switch control signal 114a being driven low during a valid fault condition.

Figure 2:
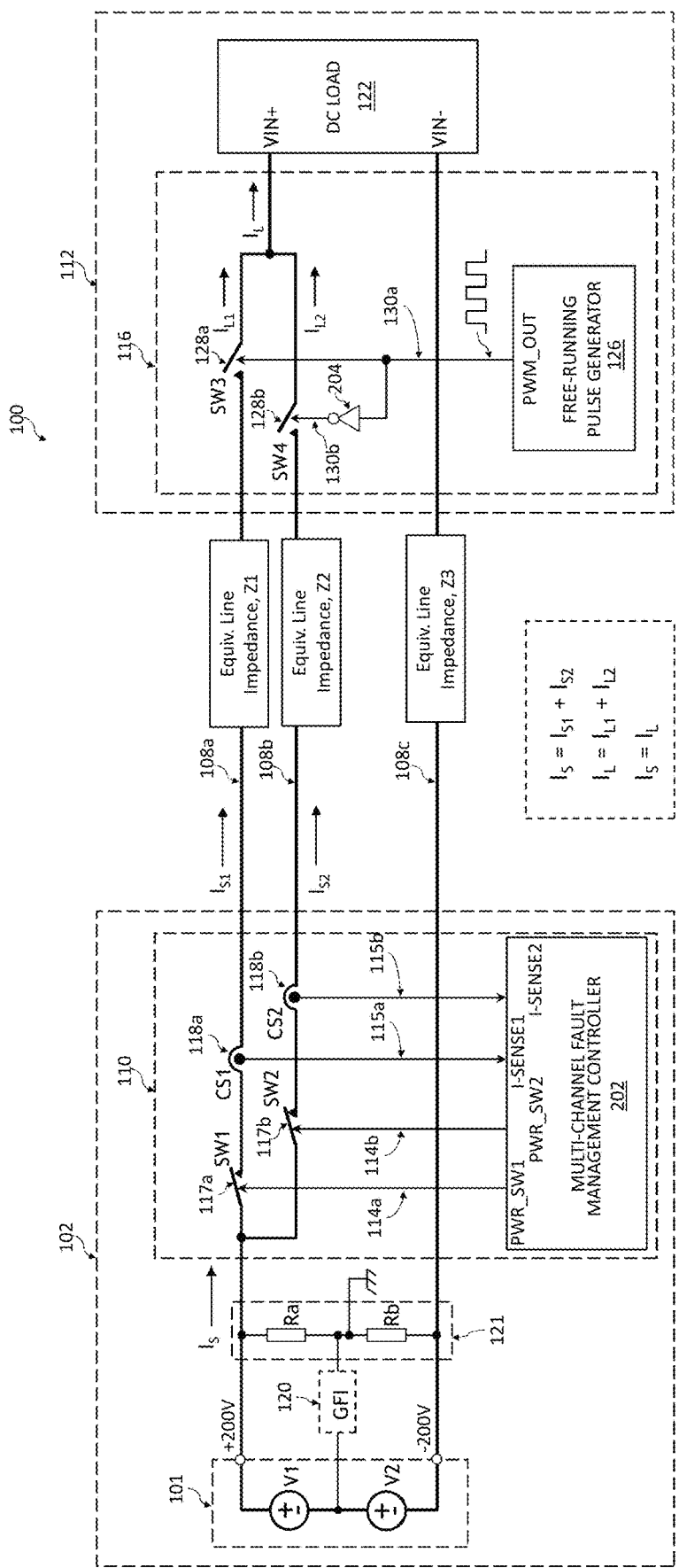
FIG. 2 is a block diagram of a fault-responsive power system using asynchronous load current switching for DC power transmission showing a transmission line with two parallel interleaved legs, according to an example embodiment.

While the system 100 of FIG. 1 shows power being delivered to the load 122 without interleaving on the first conductor 108a, power may also be interleaved to the load 122 over multiple conductors. For example, FIG. 2 depicts another embodiment of the system 100 in which power is interleaved from the power supply 101 to the load 122 over first and second conductors 108a,b, with the third conductor 108c being used as a common return line. The system 100 of FIG. 2 is identical to that of FIG. 1 except as described below.

The system 100 of FIG. 2 further comprises the second conductor 108b electrically connected in parallel with the first conductor 108a. Consequently, the total supply current $I_S$ from the power supply 100 is the sum of the first and a second supply-side current $I_{S1}$ and $I_{S2}$ on the first and second conductors 108a,b, respectively; analogously, the total load current $I_L$ entering the load is the sum of the first and a second remote-side current $I_{L1}$ and $I_{L2}$ entering the load from the first and second conductors 108a,b, respectively. Absent a fault, $I_S=I_{S1}+I_{S2}$; $I_L=I_{L1}+I_{L2}$; and $I_S=I_L$.

First and second supply-side switches 117a,b are respectively positioned on the first and second conductors 108a,b to permit the first and second supply-side currents to be turned on and off in response to first and second supply-side switch control signals 114a,b from a multi-channel fault management controller 202, respectively. The first and second supply-side switches 117a,b may be modulated to reduce the supply-side currents to less than the magnitude threshold, or opened for a sufficiently long duration to shut off the supply-side currents entirely.

First and second supply-side current sensors 118a,b are also positioned along the first and second conductors 108a,b to permit the first and second supply-side currents to be measured and sent to the multi-channel fault management controller 202 via first and second supply-side current signals 115a,b, respectively.

Similarly, on the remote-side, first and second remote-side switches 128a,b are positioned on the first and second conductors 108a,b to permit the first and second remote-side currents to be turned on and off, respectively. First and second remote-side switch control signals 130a,b respectively control the first and second remote-side switches 128a,b. As in FIG. 1, the first remote-side switch control signal 130a controls the first remote-side switch 128a. The system 100 of FIG. 2 further comprises an inverter 204 that inverts the first remote-side switch control signal 130a to generate a second remote-side switch control signal 130b used to drive the second remote-side switch 130b. The result is that when one of the remote-side switches 130a,b is open, the other is closed, resulting in interleaved power delivery to the load 122.

Figure 3:
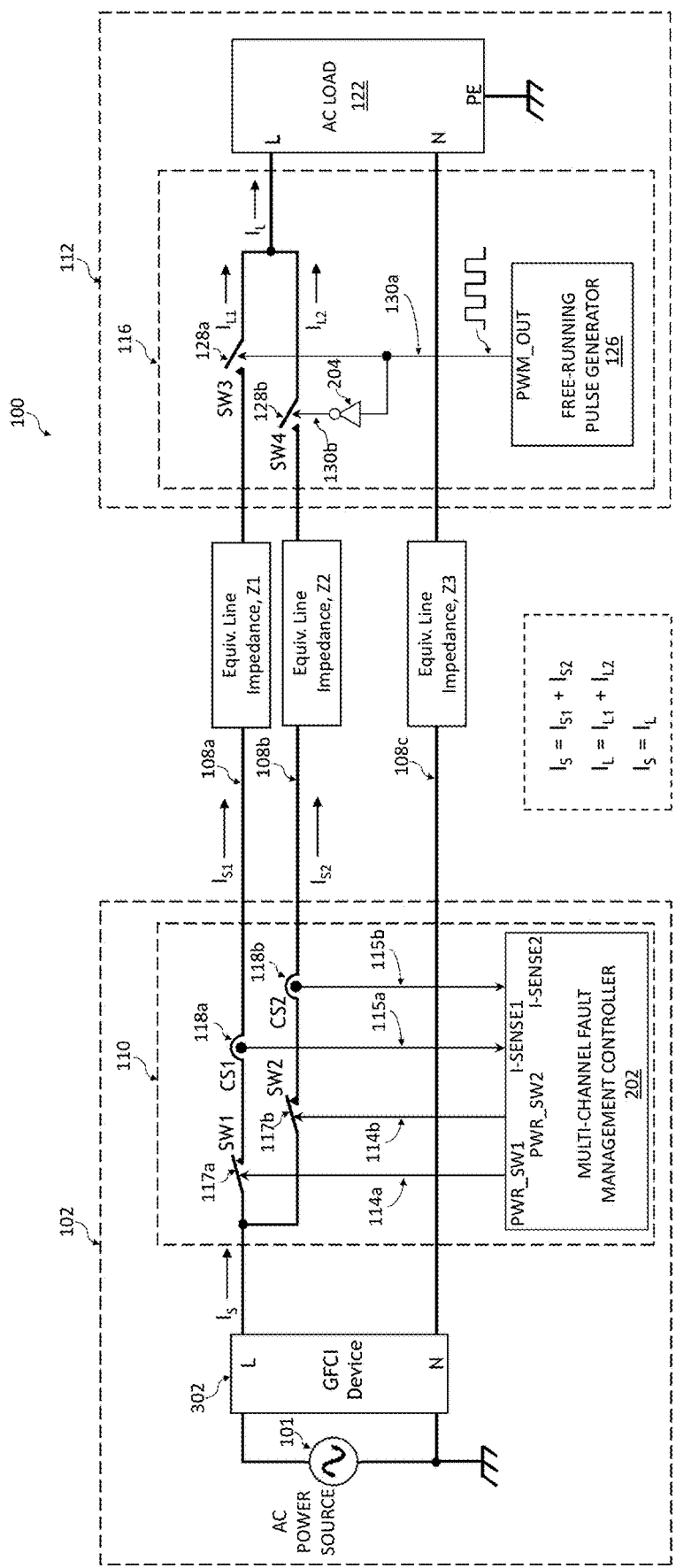
FIG. 3 is a block diagram of a fault-responsive power system using asynchronous load current switching for AC power transmission showing a transmission line with two parallel interleaved legs, according to an example embodiment.

FIG. 3 depicts another embodiment of the system 100 in which power is interleaved from the power supply 101 to the load 122. The system 100 of FIG. 3 is identical to that of FIG. 2, except it is used for AC power transmission instead of DC power transmission. The load 122 of FIG. 3 is accordingly an AC load, while the power supply 101 of FIG. 2 is replaced with an AC power source as the power supply 101 across which is connected to a ground fault circuit interrupter ("GFCI") device 301 in lieu of the GFI 120 or HRMG system 121.

Figure 8:
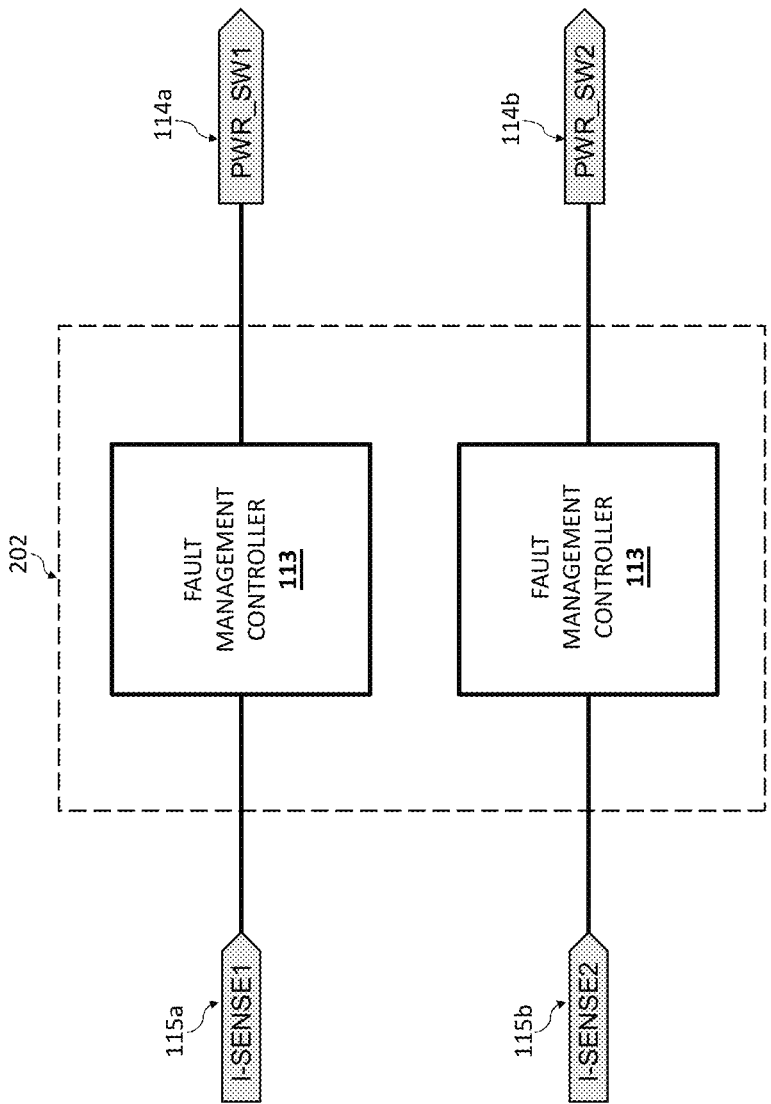
FIG. 8 is an example of a multi-channel fault management controller for the fault-responsive power systems depicted in FIGS. 2 and 3, according to another example embodiment.
Figure 14:
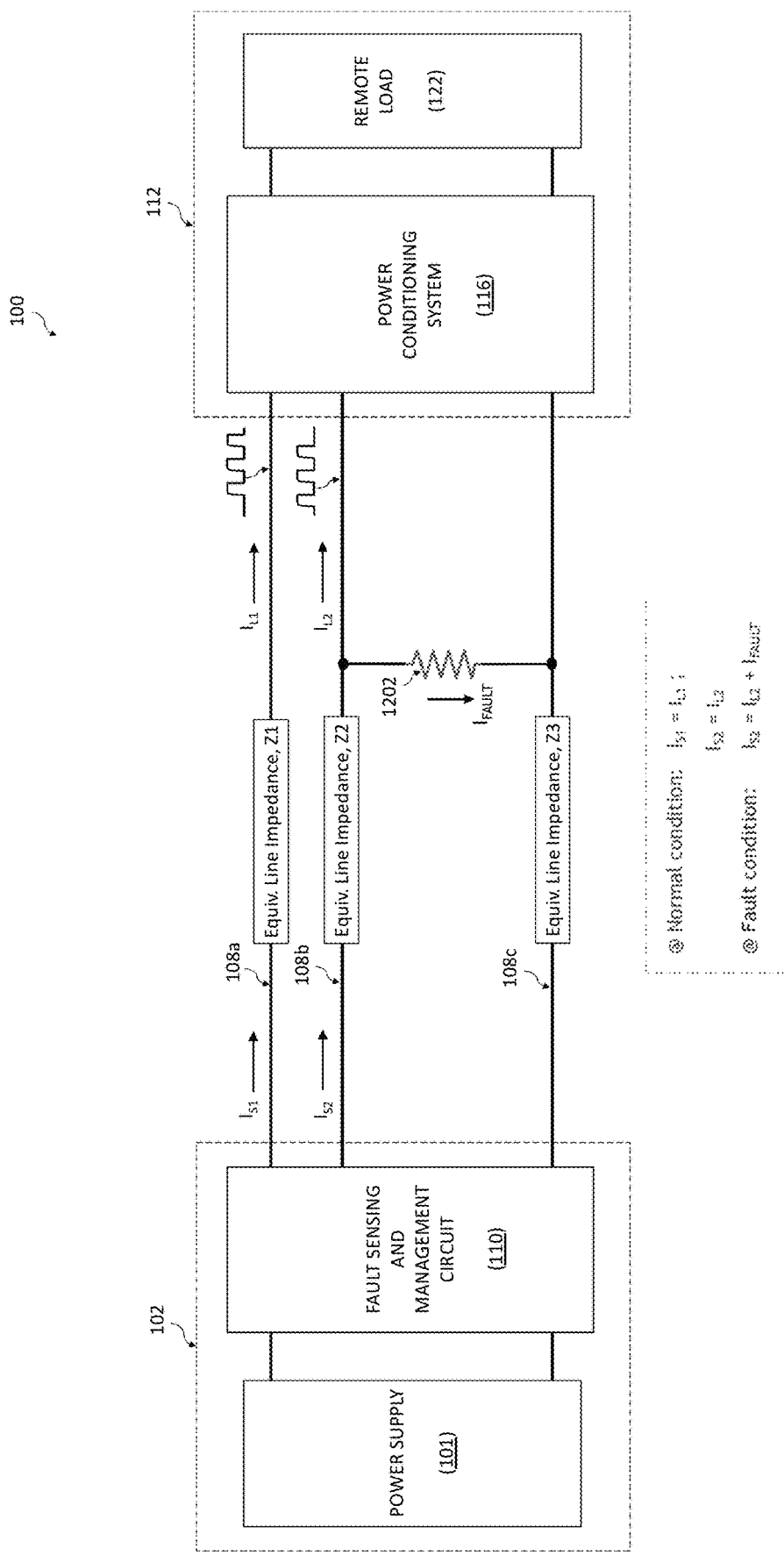
FIG. 14 is a block diagram of a fault-responsive power system comprising two live conductors and a common return line depicting the flow of line currents and their relationship to one another in the presence of line-to-line fault in one of the interleaved legs caused by an external foreign body with certain impedance, according to an example embodiment.

The fault management controller 202 of FIGS. 2 and 3 is a multi-channel controller, as opposed to the single channel controller 113 of FIG. 1. FIG. 8 depicts an example embodiment of the multi-channel fault management controller 202. In this embodiment, the multi-channel fault management controller 202 comprises two of the single channel fault management controllers 113 operating in parallel, with one of the single channel fault management controllers 113 receiving the first supply-side current signal 115a at its I-SENSE1 terminal and outputting the first supply-side switch control signal 114a at its PWR_SW1 terminal, and with the other of the single channel fault management controllers 113 receiving the second supply-side current signal 115b at its I-SENSE2 terminal and outputting the second supply-side switch control signal 114b at its PWR_SW2 terminal FIG. 14 is a block diagram of the system 100 of FIG. 2 or 3 depicting the flow of line currents and their relationship to one another in the presence of a line-to-line fault caused by an external foreign body with certain impedance, such as a person. In FIG. 14, the power transmitter 102 generally comprises the power supply 101 and fault sensing and management circuit 110, which may be used for AC or DC power transmission. Similarly, the remote unit 112 generally comprises the power conditioning system 116 and the load 122, which may be used for AC or DC power receipt. As described above in respect of FIGS. 2 and 3, $I_{S1}$ represents the first supply-side current; $I_{S2}$ represents the second supply-side current; $I_{L1}$ represents the first remote-side current; and $I_{L2}$ represents the second remote-side current. $I_{FAULT}$ represents the fault current traveling through the external foreign body 1202 from the second conductor 108b to the third conductor 108c. In normal operation where there is no fault and consequently $I_{FAULT}$ is zero, and $I_{S1}=I_{L1}$ and $I_{S2}=I_{L2}$ as mentioned above in respect of FIG. 2. However, when a fault is present as shown in FIG. 14, $I_{S2}=I_{L2}+I_{FAULT}$. While FIG. 14 shows the fault involving the second conductor 108b, the fault may additionally or alternatively involve the first conductor 108a.

Figure 9:
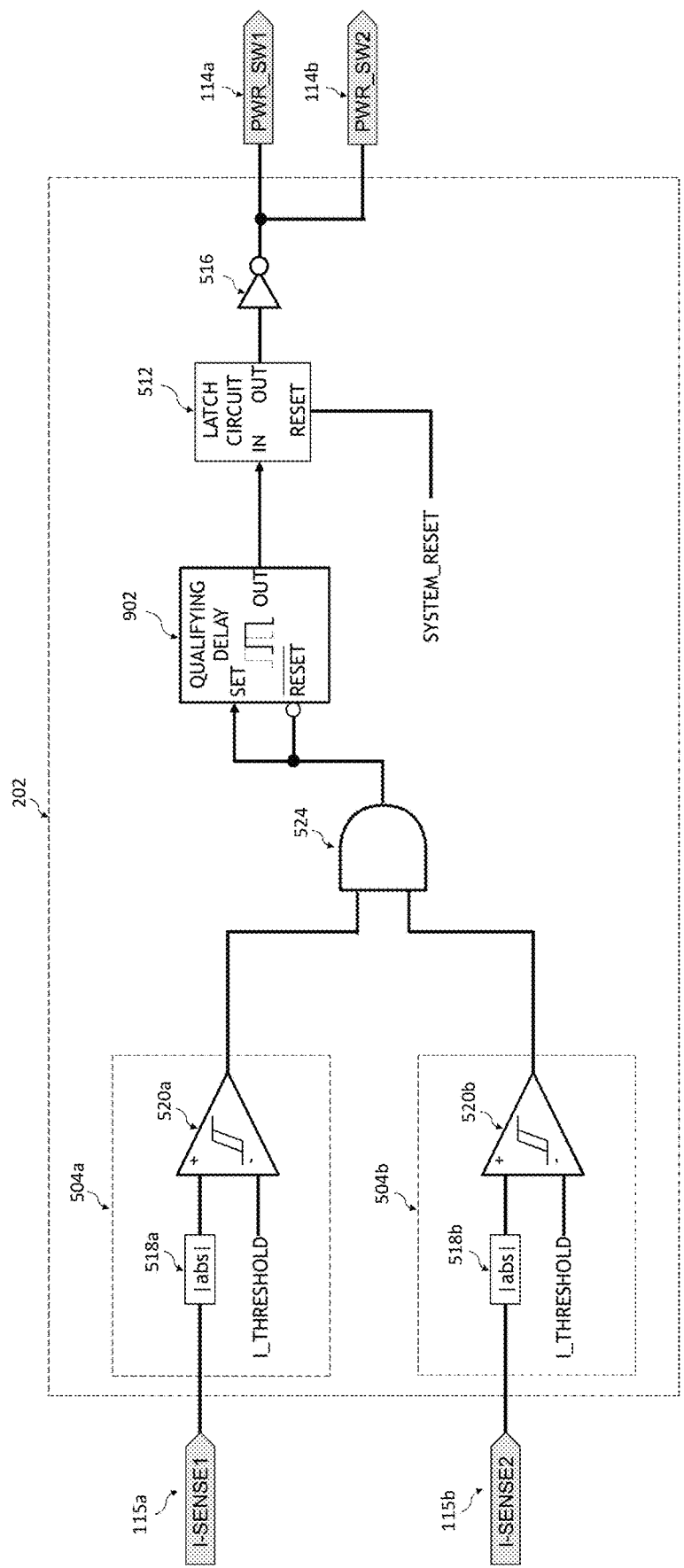
FIG. 9 is a block diagram of a logic circuit implementation of the fault management controller depicted in FIG. 8, according to an example embodiment.
Figure 10:
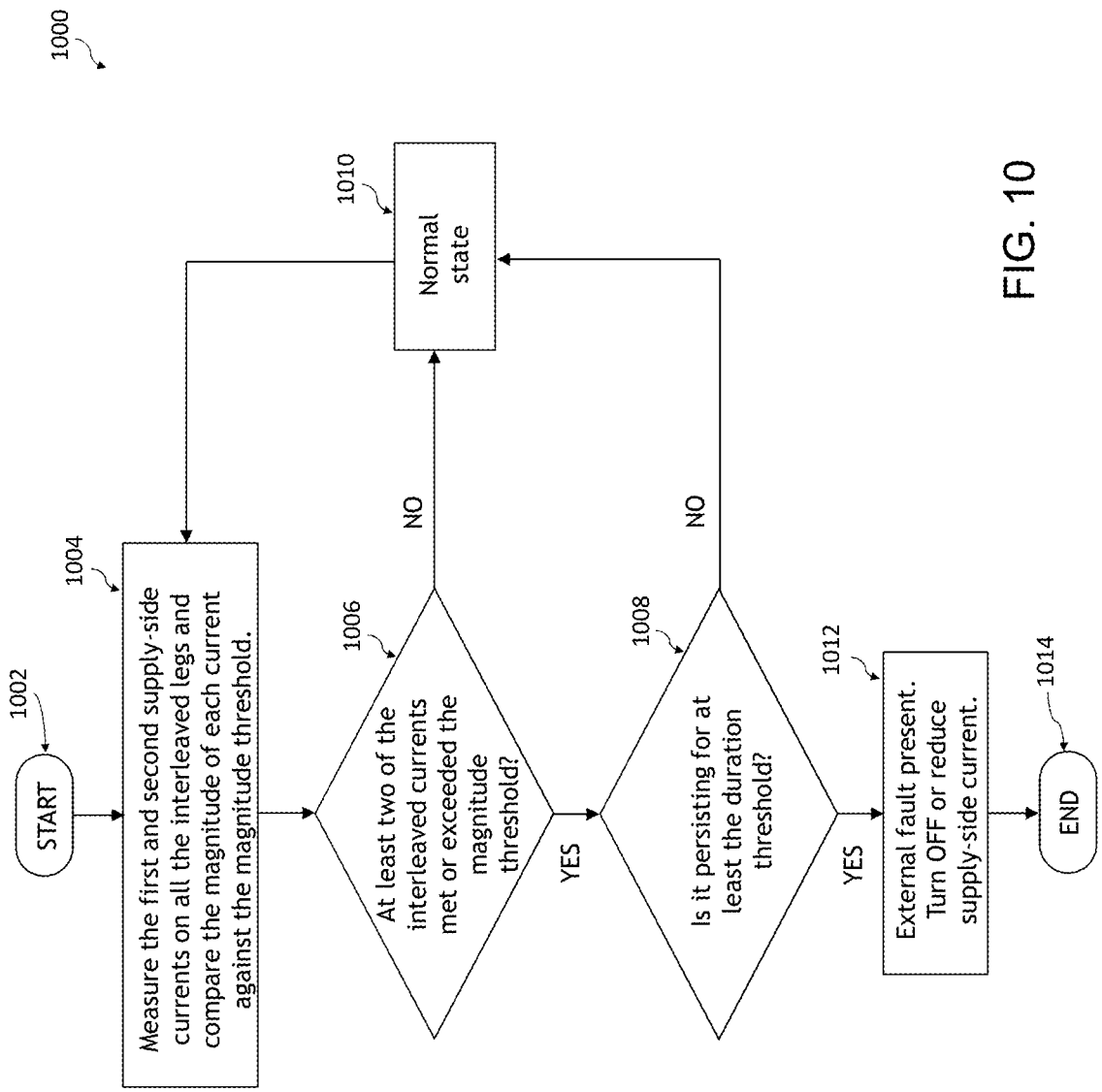
FIG. 10 is a flowchart illustrating a method applied by the fault management controller of FIG. 8 showing how the fault management controller responds during both normal and fault states, according to an example embodiment.

FIG. 10 depicts a flowchart illustrating a method 1000 applied by the multi-channel fault management controller 202 of the system 100 of FIGS. 2 and 3, showing how the multi-channel fault management controller 202 responds during both normal and fault states. This method 1000 of FIG. 10 may be expressed as computer program code and stored in a memory comprising part of the multi-channel fault management controller 202. A processor, also comprising part of the multi-channel fault management controller 202 and communicatively coupled to the memory, may execute the computer program code to cause the multi-channel fault management controller 202 to perform the method 1000 of FIG. 10. Alternatively, the multi-channel fault management controller 202 may be alternatively implemented, for example as depicted in FIG. 9, described below.

During normal operation, the system 100 of FIGS. 2 and 3 delivers interleaved power to the load by alternately shutting the first and second remote-side switches on and off. In FIG. 10, the method 1000 starts at block 1002 and proceeds to block 1004 where the multi-channel fault management controller 202 measures the first and second supply-side currents on the first and second conductors 130a,b using the first and second supply-side current sensors 118a, b, respectively. The multi-channel fault management controller 202 receives the value of the first and second supply-side currents via the first and second supply-side current signals 115a,b, respectively. The multi-channel fault management controller 202 compares the magnitudes of each of the first and second supply-side currents to the magnitude threshold, whose value is selected as described further in respect of FIG. 6 below.

At block 1006, the multi-channel fault management controller 202 determines whether each of the first and second supply-side currents magnitudes exceeds the magnitude threshold. If they do not exceed the magnitude threshold at the same time, the multi-channel fault management controller 202 proceeds to block 1010 where it concludes the system 100 is operating in a normal (i.e., non-fault) state, and returns to block 1004. However, if both of the first and second supply-side currents magnitudes do exceed the magnitude threshold at the same time, the multi-channel fault management controller 202 proceeds to block 1008 to determine whether this has persisted for at least the duration threshold. The value selected for the duration threshold in this embodiment may be, for example, between 5 and 10 ms. The effect of the fault management controller 202 determining that the first and second supply-side currents satisfy blocks 1006 and 1008 is a determination that, at least for the duration threshold, each of the first and second supply-side currents has met or exceeded the magnitude threshold. Consequently, the fault management controller 202 proceeds to block 1012 where it sends the first and second supply-side control signals 114a,b to the first and second supply-side switches 117a,b to open them for a sufficiently long period of time to shut off the first and second supply-side currents, or modulated to reduce the first and second supply-side currents to non-zero values less than the magnitude threshold, respectively. The fault management controller 202 then proceeds to block 1014, where the method 1000 ends.

Referring now to FIG. 9, there is shown a block diagram of a logic circuit implementation of the fault management controller 202 comprising part of the system 100 of FIGS. 2 and 3, according to an example embodiment. The fault management controller 202 of FIG. 9 receives as inputs the first and second supply-side current signals 115a,b at terminals I-SENSE1 and I-SENSE2, respectively. The first supply-side current signal 115a is input to the first current signal qualifying circuitry identical to that depicted in FIG. 5, and the second supply-side current signal 115b is input to second current signal qualifying circuitry 504b that comprises second absolute value processing circuitry 518b and a second comparator 520b analogous to the first absolute value processing circuitry 518a and the first comparator 520a of the first current signal qualifying circuitry 504a, respectively.

The outputs of the first and second comparators 520a,b are both driven high when each of the magnitudes of each of the first and second supply-side current signals exceeds the magnitude threshold, represented in FIG. 9 as I_THRESHOLD. When both outputs are driven high, the output of the AND gate 524 is accordingly also driven high and sets signal on-delay circuitry comprising a qualifying delay timer 902 that is configured to output an intermediate signal when the first and second comparator output signals both indicate that each of the magnitudes of the first and second supply-side currents have exceeded the magnitude threshold. The qualifying delay timer 902 may assume an arbitrary predetermined qualifying delay for the duration threshold and is intended in order to provide better noise rejection by validating if the fault is persisting or if it is just a momentary glitch. If the intermediate signal is indeed sustained and not just a transient noise event, then a fault signal is asserted. More particularly, the fault signal is input to the latch circuit 512, which drives the inverter 516. The output of the inverter 516 is driven low in response to the high fault signal, and the inverter's 516 output is used as the first and second supply-side switch control signals 114a,b respectively output on PWR_SW1 and PWR_SW2 terminals. The output of the latch circuit 512 remains low until the system 100 and consequently also the latch circuit 512 is reset using the SYSTEM_RESET signal.

Figure 15:
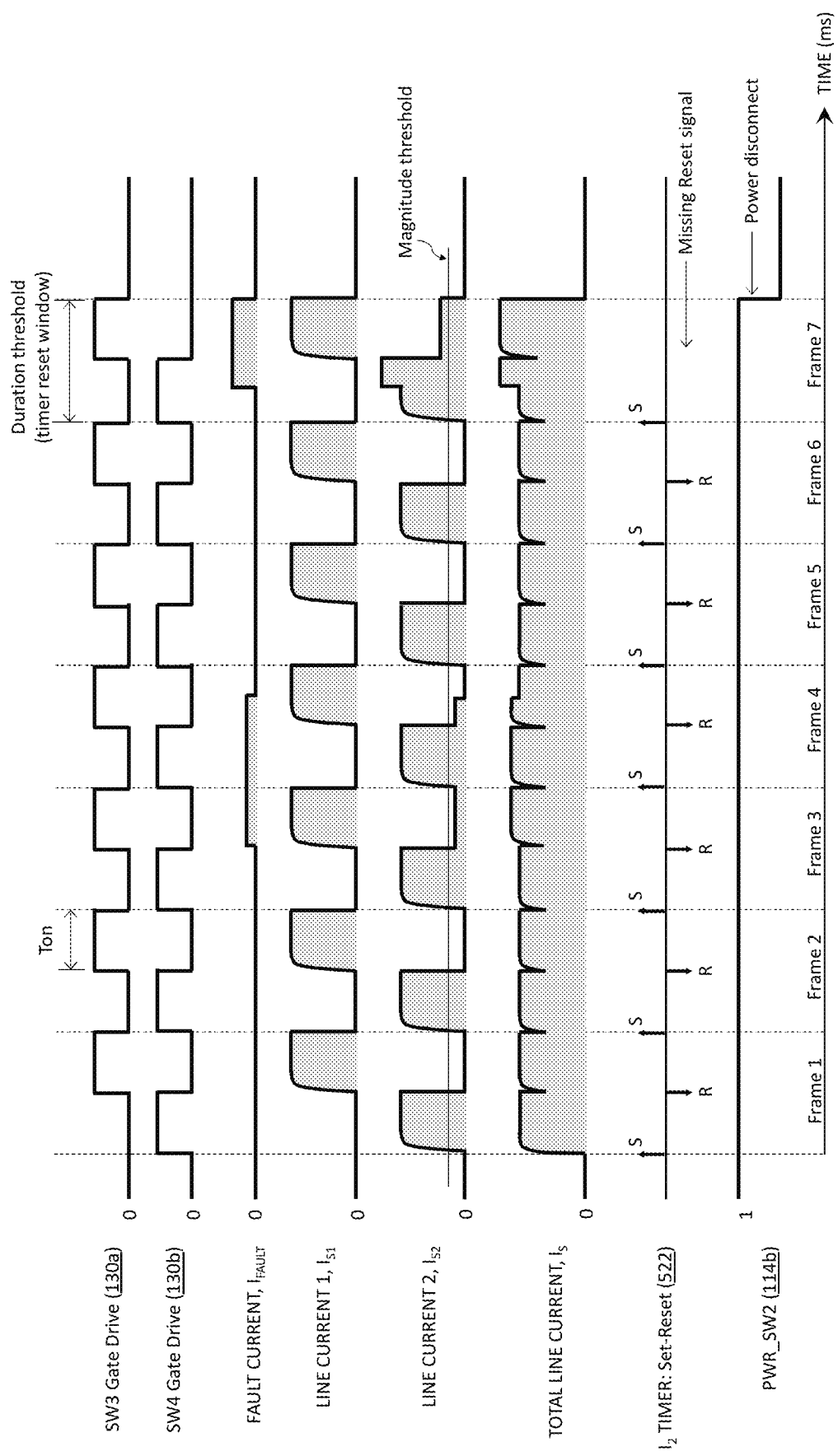
FIGS. 15 and 17 are timing diagrams illustrating timing sequences of selected signals, parameters, and the fault response of both the fault sensing and management circuit and a power conditioning system for the fault-responsive power system depicted in FIG. 14 being used to transmit DC power, according to an example embodiment.

Referring now to FIG. 15, there is depicted a timing diagram illustrating a timing sequence of selected signals, parameters, and the fault response of the fault sensing and management circuit 110 and power conditioning system 116 of FIG. 14 used to deliver DC power, according to an example embodiment. In FIG. 15, $I_{S1}$ is the first supply-side current, $I_{S2}$ is the second supply side current, $I_{FAULT}$ is the fault current, $I_S=I_{S1}+I_{S2}$, the SW3 and SW4 Gate Drive signals are respectively the first and second remote-side switch control signals, PWR_SW2 is the second supply-side switch control signal, and the "I2 TIMER: Set-Reset" signal shows when the on-delay timer's 522 internal counter for the second supply-side current is set using an active high signal at the SET input shown in FIG. 5, and when the on-delay timer's 522 internal counter is reset using an active low signal at the RESET input shown in FIG. 5.

The pulse generator 126 generates complementary first and second remote-side switch control signals 130a,b to drive the first and second remote-side switches 128a,b, respectively. The power conditioning system 116 is designed such that the maximum duration of Ton (in this case, the duty cycle is nominally 50%) is always less than the value of the duration threshold adopted by the multi-channel fault management controller 202. Even if a dynamic values for both Ton and the duration threshold are implemented as a function of load and supply-side currents respectively, Ton remains less than the duration threshold, otherwise the system 100 operation is disrupted even in the absence of a fault.

The moment the $I_{S2}$ crosses the magnitude threshold level, it sets the on-delay timer 522. If $I_{S2}$ drops below the magnitude threshold, it resets the on-delay timer 522. This operation is shown in Frames 1 to 6.

If a fault is present on the second conductor 108b but the magnitude of fault current $I_{FAULT}$ is less than the magnitude threshold, then it will not affect the operation of the system 100. The on-delay timer 522 is still controlled mainly by the line current $I_{S2}$ and it is reset in a timely manner as shown in Frames 3 and 4.

In the event where the fault current $I_{FAULT}$ exceeds the magnitude threshold and does not decrease below the magnitude threshold prior to the duration threshold, a different response mode is triggered. As shown in Frame 7, the line current $I_{S2}$ is expected to come down below the magnitude threshold level. However, because of the contribution of the fault current $I_{FAULT}$, the on-delay timer 522 cannot be reset since the line current $I_{S1}$ is still above the magnitude threshold. While this is happening, the internal counter of the on-delay timer 522 continues incrementing until it reaches the point where it exceeds the duration threshold. When this happens, the reset signal is not triggered as shown in Frame 7, and the latch circuit 512 consequently outputs a signal that cuts off the second supply-side current using the second supply-side switch control signal 114b to stop the flow of power to the transmission line. In FIG. 15, as the fault results from $I_{S2}$ staying above the magnitude threshold for at least the duration threshold and not $I_{S1}$, the multi-channel fault controller 202 reduces only the second supply-side current using the second supply-side switch control signal 114b such that the second supply-side current is reduced to less than the magnitude threshold while the first supply-side current is permitted to exceed the magnitude threshold. This may be done with the multi-channel fault controller 202 of FIG. 8, for example, and is in contrast to the behavior of FIG. 17 described below.

Figure 17:
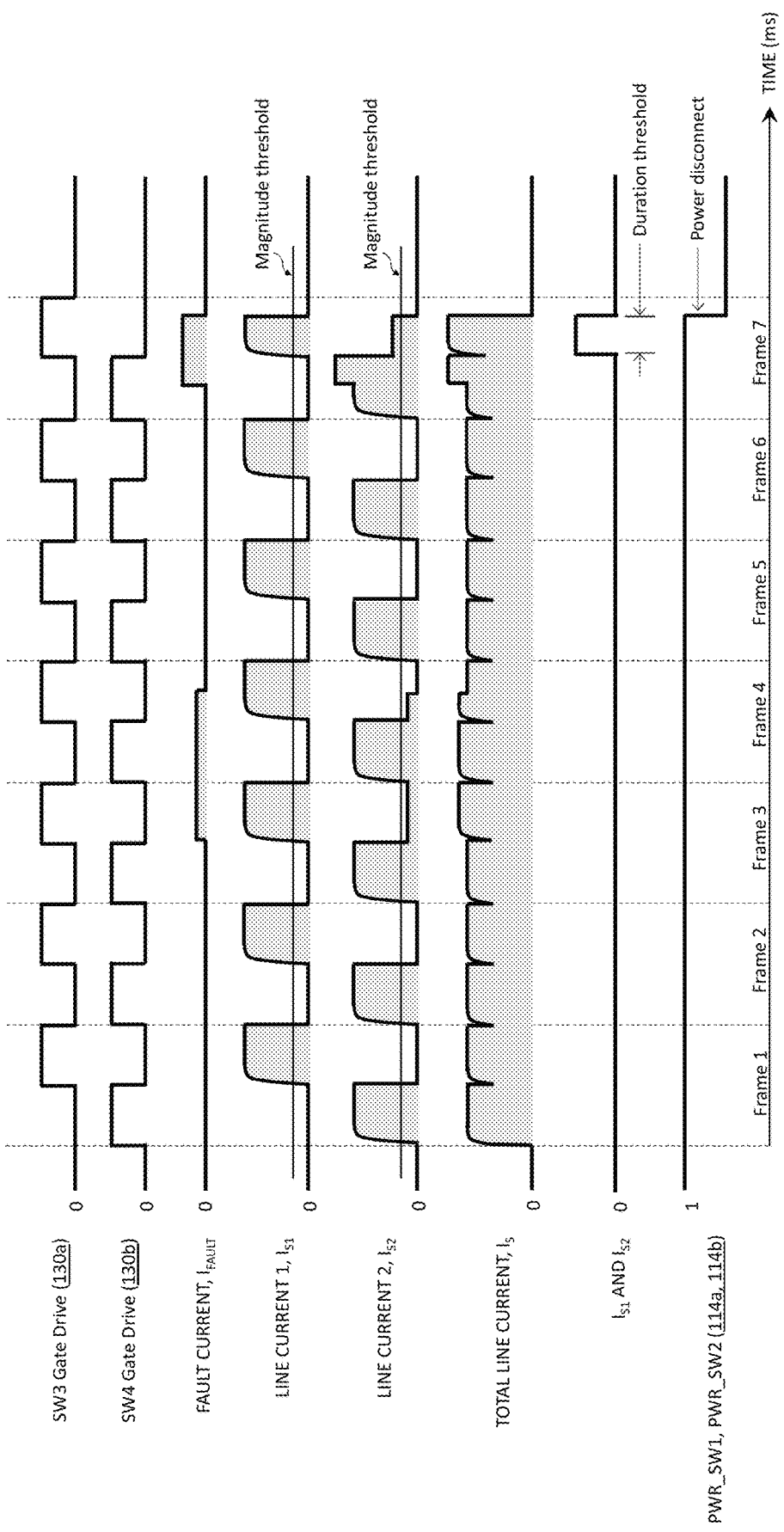

In FIG. 17, there is depicted a timing diagram illustrating a timing sequence of selected signals, parameters, and the fault response of the fault sensing and management circuit 110 and power conditioning system 116 of FIG. 14 used to deliver DC power, according to an example of another embodiment as described in FIG. 9 and FIG. 10. As in FIG. 14, FIG. 17 shows a line-to-line fault occurring on the second conductor 108b.

More particularly, and in contrast to FIG. 15, the multi-channel fault management controller 202 determines a fault condition if at least two of the interleaved legs (i.e., the first and second conductors 108a,b in the system 100 of FIG. 14, although more generally at least two interleaved legs in a system 100 that uses more than two of the conductors to deliver power to the load 122) have current exceeding the magnitude threshold and occurring simultaneously. As shown in Frame 7, the line current $I_{S2}$ is expected to come down below the magnitude threshold while at same time the line current $I_{S1}$ starts to rise and exceeds the magnitude threshold. Since a fault is present having a magnitude of the fault current $I_{FAULT}$ also exceeding the magnitude threshold, it prevents the line current $I_{S2}$ from falling below the magnitude threshold. This occurrence is detected by the AND gate 524, which drives its output high. If the AND gate's 524 output is driven high for at least the duration threshold assigned a value of a predetermined qualifying delay, the latch circuit 512 is activated which in turns generates the fault signal that cuts off the first and second supply-side currents using the first and second supply-side switch control signals 114a,b, respectively. Accordingly, using the multi-channel fault controller 202 of FIG. 9, both the first and second supply-side currents are shut off in FIG. 15 even if the fault directly affects only one of the first and second conductors 108a,b. More generally, when the architecture of the multi-channel fault controller 202 of FIG. 9 is used, all of the supply-side currents are reduced below the magnitude threshold in response to a fault regardless of which of the supply-side currents is actually directly affected by the fault. In contrast, when using the multi-channel fault controller 202 of FIG. 8, it is possible to only shut off those supply-side currents directly affected by the fault while still relying on the remaining supply-side currents to deliver power to the load 122.

Figure 16:
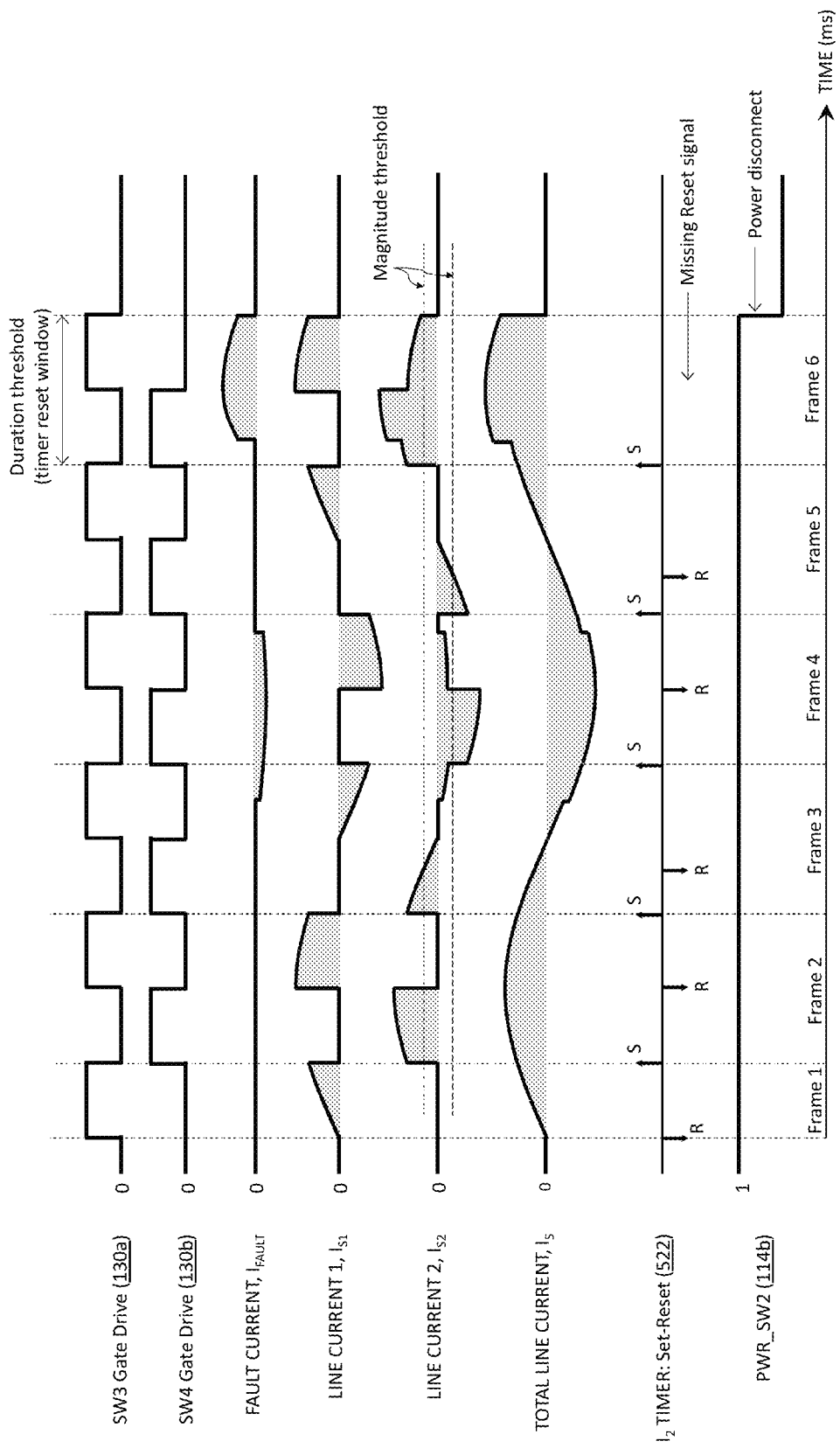
FIG. 16 is a timing diagram illustrating a timing sequence of various signals, parameters, and the fault response of both the fault management controller and a power conditioning system for the fault-responsive power system depicted in FIG. 14 being used to transmit AC power, according to an example embodiment.

Referring now to FIG. 16, there is depicted a timing diagram analogous to that of FIG. 15 except the system 100 of FIG. 14 is used to deliver AC power instead of DC power. The load 122 is presumed to be a resistive load or other equivalent linear load for simplicity although the diagram may be extended to non-linear loads as well. A notable difference between FIGS. 15 and 16 is that in FIG. 16 the line currents $I_{S1}$ and $I_{S2}$ reverse direction due to the nature of the AC sinusoidal system.

Referring now to FIGS. 18A-D, there are shown waveforms based on different configurations of the pulse generator 126 generating PWM output signals having dynamic or adaptive period and Ton time settings, according to an example embodiment.

Figure 18A:
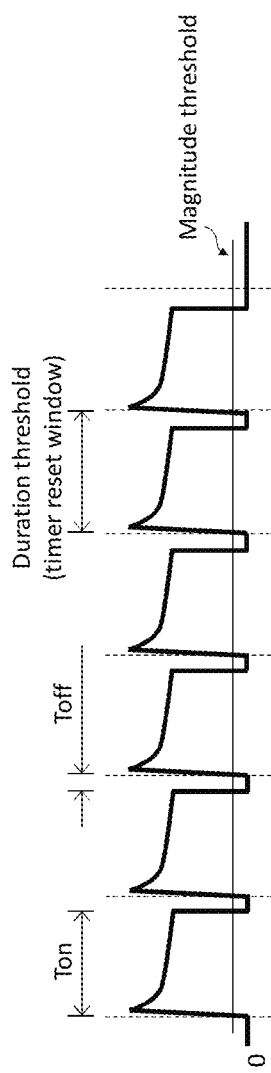
FIGS. 18A-D show waveforms based on different configurations of the pulse generator generating pulse width modulation ("PWM") output signals having dynamic or adaptive period and Ton time settings, according to an example embodiment.

FIG. 18A is a timing diagram of the load current $I_L$ or the supply-side current $I_S$ at rated load condition with the pulse generator 126 configured to generate the PWM output signal with a fixed frequency and fixed Ton time regardless of load.

Figure 18B:
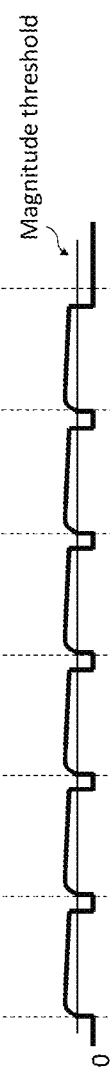

FIG. 18B is a timing diagram of the load current $I_L$ or the supply-side current $I_S$ at a light load condition with the pulse generator 126 configured to generate the PWM output signal with fixed frequency and fixed Ton time regardless of load.

Figure 18C:
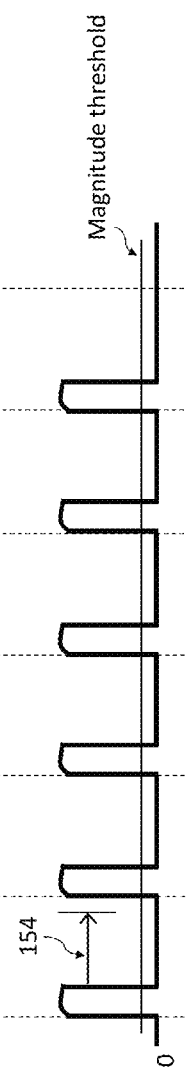

FIG. 18C is a timing diagram of the load current $I_L$ or the supply-side current $I_S$ at the same light load condition as in FIG. 18B but with the pulse generator 126 configured to generate the PWM output signal with fixed frequency and variable Ton time as a function of load current $I_L$.

Figure 18D:
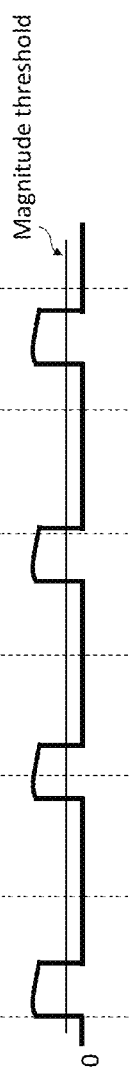

FIG. 18D is a timing diagram of the load current $I_L$ or the supply-side current $I_S$ at the same light load condition as in FIG. 18B but with the pulse generator 126 configured to generate the PWM output signal with both variable frequency and variable Ton time as a function of load current $I_L$.

The merit of varying the frequency or duty cycle at light load is in order to maximize the off-time as much as possible without affecting the power delivery performance. Maximizing the off-time allows for a longer time to qualify or evaluate any potential fault occurrence, thereby increasing the protection circuit reliability and robustness.

Figure 19:
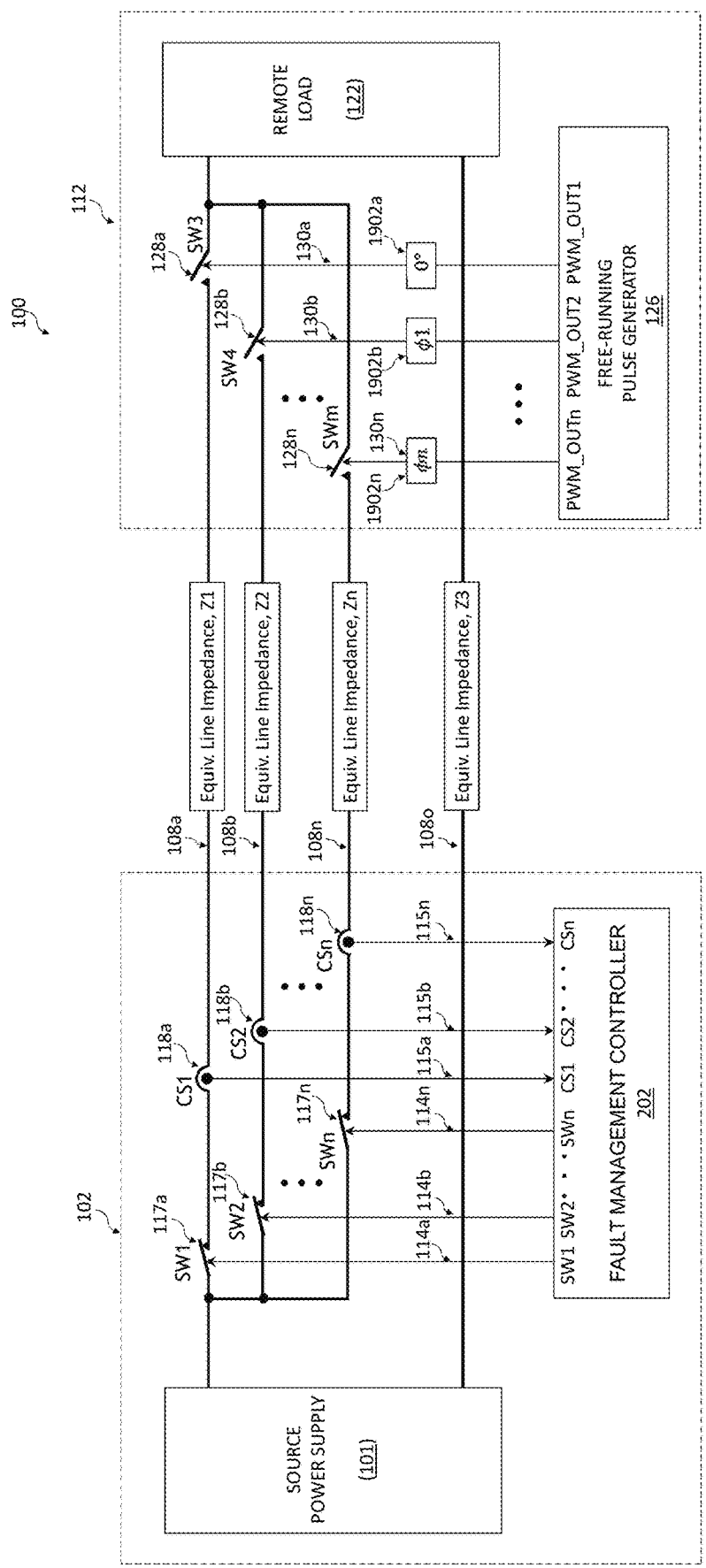
FIG. 19 is a block diagram of a fault-responsive power system using asynchronous load current switching for DC or AC power distribution depicting a multi-phase configuration and using an interleaved transmission line, according to an example embodiment.

FIG. 19 depicts a block diagram of the fault-responsive power system 100 using asynchronous load current switching for DC or AC power distribution in which a multi-phase configuration is implemented using an interleaved transmission line, according to an example embodiment. More particularly, the system 100 of FIG. 19 is analogous to that depicted in FIGS. 2 and 3 in that the power supply 101 may be AC or DC, and the load 122 may similarly be AC or DC. In contrast to the system of FIGS. 2 and 3 that deliver interleaved power over the first and second conductors 108a,b, the system 100 of FIG. 19 delivers interleaved power over first through nth conductors 108a-n, with a common return conductor 108o acting as a common return line. Each of the first through nth conductors 108a are connected in parallel at the supply-side to the power supply 101 and at the remote-side to the load 122. Consequently, first through nth supply-side currents respectively enter the first through nth conductors 108a-n; and the load current $I_L$ is the sum of first through nth remote-side currents entering the load 122 respectively from the first through nth conductors 108*a-n*. First through nth supply-side switches 117*a-n* are respectively located on the first through nth conductors 108*a-n* to permit individual control of current on each of the first through nth conductors 108*a-n*, and the first through nth supply-side switches 117*a-n* are respectively controlled by first through nth supply-side switch control signals 114*a-n* sent by the fault management controller 202. Similarly, first through nth supply-side current sensors 118*a-n* are respectively located on the first through nth conductors 108*a-n* to measure the first through nth supply-side currents, and the sensors 118*a-n* report their current readings to the fault management controller 202 using first through nth supply-side current signals 115*a-n*, respectively.

Similarly, first through nth remote-side switches 128*a-n* are positioned along the first through nth conductors 108*a-n* to permit the first through nth remote-side currents to be turned on and off. First through nth remote-side switch control signals 130*a-n* respectively control the first through nth remote-side switches 128*a-n*. The first through nth remote-side switch control signals 130*a-n* are generated by outputting signals at the PWM_OUT1-PWM_OUTn terminals of the pulse generator 126, respectively, through first through nth phase shifters 1902*a-n* that respectively phase shift the signals at the PWM_OUT1-PWM_OUTn terminals from 0 degrees to cm degrees, respectively. The phase difference between each of the first through nth remote-side switch control signals 130*a-n* may take an arbitrary value but for nominal configuration, the following equation can be used as reference: Phase_shift=(360/n), where n is the number of parallel interleaved legs. For example, for three interleaved legs, the first phase shifter 1902*a* may apply a phase shift of 0 degrees, the second phase shifter 1902*b* may apply a phase shift of 120 degrees, and the third phase shifter 1902*c* may apply a phase shift of 240 degrees.

Figure 20:
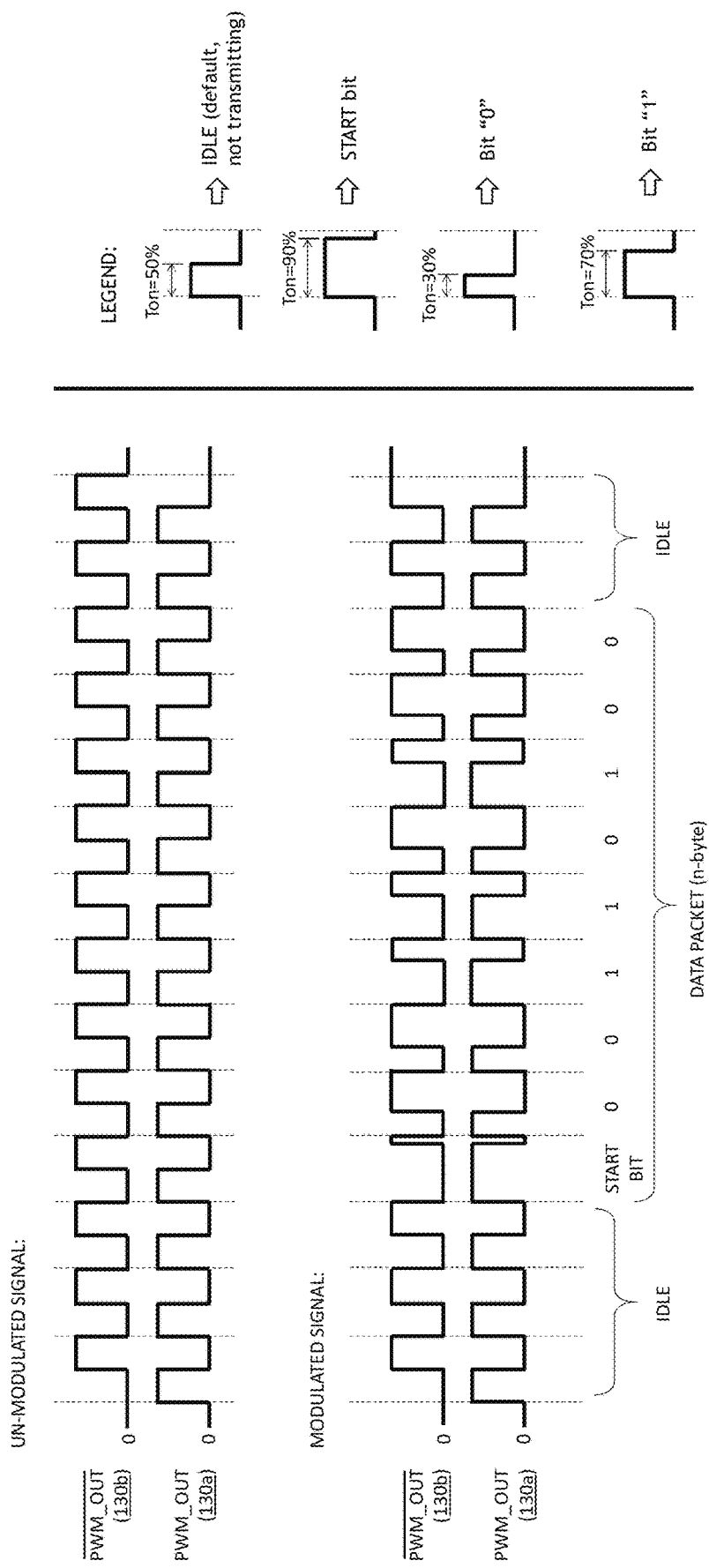
FIG. 20 is a waveform sequence of the PWM signal generated by the pulse generator enabling the fault-responsive system of FIG. 1 to transmit data from a remote-side of the system to a source-side of the system by modulating the duty cycle of the PWM output drive signal, according to an example embodiment.

Referring now to FIG. 20, there is depicted a waveform sequence of the PWM signal generated by the pulse generator 126 enabling the system 100 of FIG. 2 to transmit data from the pulse generator 126 located at its remote-side to the fault management controller 202 located at its source-side by modulating the PWM signal, according to an example embodiment. While FIG. 20 is described in respect of FIG. 2, it analogously may also be used to transmit data using the system 100 of FIG. 1 or FIG. 3.

Data transmission is initiated at the remote-side by the pulse generator 126. As discussed above in respect of FIG. 11, the output selector switch 1122 is moved to a state where it connects the second pulse generation circuitry 1124 to the output terminal PWM_OUT. Included in the system 100 but not shown in the drawing is the controller that also collects data from the appropriate sensors and other devices at the remote-side, such as sensors used to collect data to be transmitted. The data packet in the register 1126 to be transmitted to the fault controller 113 is used by the communications transmitter 1128 to modulate the duty cycle of each successive set of pulses according to a suitable communication protocol.

A particular encoding is selected for use as a START bit, indicating the start of a data signal. In the example of FIG. 20, a duty cycle of a pulse comprising the PWM signal of 50% is considered as an idle cycle in which no data is being transmitted; a 90% duty cycle is considered a START bit; and any succeeding pulses after the START bit carry the data to be transmitted on bit-by-bit basis depending on the size of the data packet. Also as shown in FIG. 20, adopting binary coding, a pulse with duty cycle of no more than 30% may be set equivalent to a "0" bit, while a pulse with a duty cycle of at least 70% is equivalent to a "1" bit. FIG. 20 shows the an unmodulated and a modulated signal, with the modulated signal starting with three idle cycles that do not contain data; and a 9-bit data packet comprising a START bit followed by eight data bits. After the data package is transmitted, the idle cycles resume.

Changing the duty cycle of the PWM signal used to modulate the first remote-side switch 128*a* in accordance with the data to be transferred to the fault management controller 113 generates load current $I_{L1}$ (equivalent to the first remote-side current in FIG. 2) corresponding to the duty cycle, which consequently causes the line current $I_S$ (equivalent to the first supply-side current in FIG. 1) to have an identical duty cycle absent a fault. This is a consequence of using PWM using current as the modulated signal as opposed to a traditional voltage-driven modulation technique. As described above in respect of FIG. 5, the demodulator circuitry 528 is able to then treat the current signal as a carrier signal, and to demodulate the encoded data packet from it.

Examples of data that can be transmitted to the communications receiver 530 for the purpose of reporting, diagnostics, or general telematics monitoring comprise for example serial number, output voltage/current/power, input voltage/current/power, alarms, temperature, operating hours, and transient events.

In certain applications where no load or light-load operation also exists as a valid operating condition, a switchable dummy load (not shown) can be added in order to enable the line current to exceed the magnitude threshold to permit transmission of modulated pulses that can be detected by the communications receiver 530.

Figure 21:
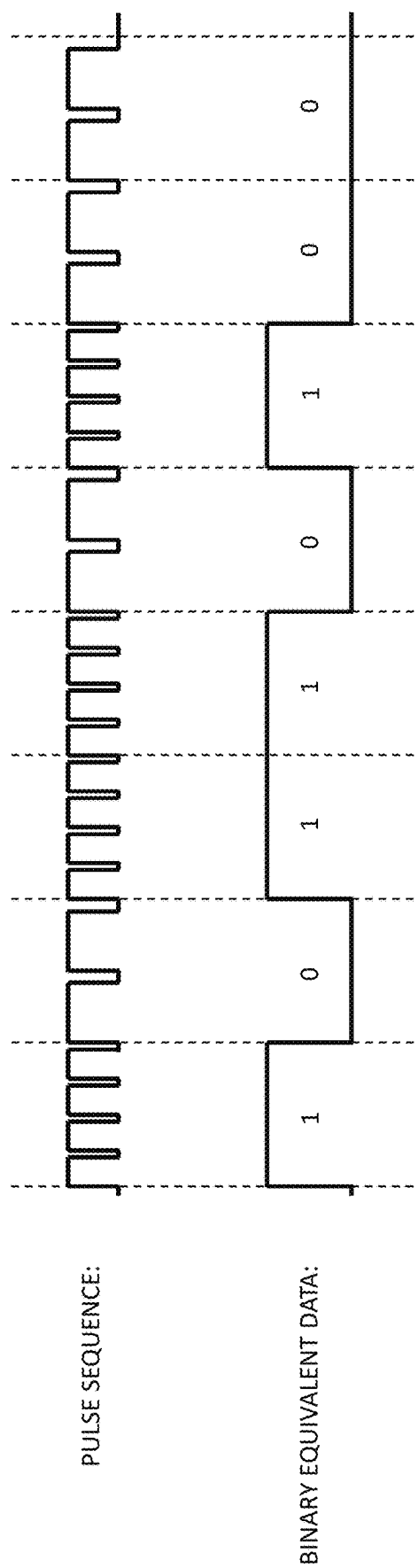
FIG. 21 is a waveform sequence of the PWM signal generated by the remote-side pulse generator enabling the system to transmit data from the remote-side to the source-side by modulating the frequency of the PWM output drive signal, according to an example embodiment.

Referring now to FIG. 21, there is shown a waveform sequence of the PWM signal generated by the pulse generator 126 enabling the system 100 to transmit data from the pulse generator 126 located at its remote-side to the fault management controller 202 located at its source-side by modulating the PWM signal, according to an example embodiment. In FIG. 21, PFM is used to modulate the PWM signal as mentioned in respect of FIG. 11 above. FIG. 21 shows that the PFM-modulated signal encodes "1" bits at a frequency twice that of "0" bits. More generally, any suitable frequency modulation distinction between the "1" and "0" bits may be used, with a third distinct frequency modulation selected for use as the START bit. The PWM may be alternatively modulated, such as by using Pulse Code Modulation ("PCM")

Referring now to FIG. 22, there is depicted a block diagram of the power supply 101 that may be used in the system 100 of FIG. 1, according to an example embodiment.

In FIG. 22, 48 V (+48 V at one terminal and 0 V at the other terminal) is applied across the power supply's 101 input terminals. The voltage is sequentially processed by input filters and protection 1302, primary switches 1304, secondary rectifiers 1306, output filters 1308, an active dummy load 1310, and a ground-fault protection circuit 1312. Example circuitry may comprise or be based on, for example, an LLC Resonant Converter topology. This circuitry acts as a DC-to-DC converter that converts the 48 V input signal to a suitable output voltage; for example, +200V and −200V representing V1 and V2 respectively. The secondary rectifiers 1306, output filters 1308, active dummy load 1310, and ground-fault protection circuit 1312 collectively comprise a secondary output circuit 1316.

The fault management controller 113 is integrated into a combined DC-to-DC converter microcontroller and fault management controller 1318. The controller 1318 is electrically coupled to the primary switches 1304 so as to generate and send to the primary switches a drive signal labeled "PWM Drive" in FIG. 22 that disables the primary switches 1304 and thereby shut off the first supply-side current in response to a fault. Alternatively, in accordance with a corresponding PWM Drive signal, the switching operation of the primary switches 1304 can also be modulated to reduce the output V1 and V2 to a safe level (e.g., 60V or less) in response to a fault. The controller 1318 applies the same logic as described above in respect of the fault management controller 113. The controller 1318 obtains the value of the first supply-side current via a current sensor 1314.

The active dummy load 1310 is controllable by the controller 1318 in order to provide a fast discharge on the output capacitors of the DC-DC converter. This helps voltage across the capacitors comprising part of the DC-DC converter to quickly decay to zero particularly at light load conditions, decreasing the likelihood of electrical shock.

The ground-fault protection circuit 1312 provides protection in the event of a line-to-ground fault. The ground-fault protection circuit 1312 may comprise, for example, a GFI or a high resistance midpoint ground system.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise. It will be further understood that the terms "comprises" and "comprising", when used in this specification, specify the presence of one or more stated features, integers, steps, operations, elements, and components, but do not preclude the presence or addition of one or more other features, integers, steps, operations, elements, and components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections. The term "and/or" as used herein in conjunction with a list means any one or more items from that list. For example, "A, B, and/or C" means "any one or more of A, B, and C".

The controllers 113,202 used in the foregoing embodiments may comprise, for example, a processing unit (such as a processor, microprocessor, or programmable logic controller) communicatively coupled to a non-transitory computer readable medium having stored on it program code for execution by the processing unit, microcontroller (which comprises both a processing unit and a non-transitory computer readable medium), field programmable gate array (FPGA), system-on-a-chip (SoC), an application-specific integrated circuit (ASIC), or an artificial intelligence accelerator. Examples of computer readable media are non-transitory and include disc-based media such as CD-ROMs and DVDs, magnetic media such as hard drives and other forms of magnetic disk storage, semiconductor based media such as flash media, random access memory (including DRAM and SRAM), and read only memory.

It is contemplated that any part of any aspect or embodiment discussed in this specification can be implemented or combined with any part of any other aspect or embodiment discussed in this specification.

In construing the claims, it is to be understood that the use of computer equipment, such as a processor, to implement the embodiments described herein is essential at least where the presence or use of that computer equipment is positively recited in the claims.

One or more example embodiments have been described by way of illustration only. This description is being presented for purposes of illustration and description, but is not intended to be exhaustive or limited to the form disclosed. It will be apparent to persons skilled in the art that a number of variations and modifications can be made without departing from the scope of the claims.

The invention claimed is:

1. A system comprising: (a) a first supply-side current sensor for measuring a first supply-side current entering a first conductor from a power supply; (b) a first supply-side switch for adjusting a magnitude of the first supply-side current; (c) a first remote-side switch for turning a first remote-side current on and off, wherein the first remote-side current enters a load from the first conductor; (d) a pulse generator configured to generate a pulse width modulation signal for modulating the first remote-side switch to turn the first remote-side current on and off; and (e) a fault management controller for communicating with the first supply-side current sensor and the first supply-side switch and configured to: (i) determine that, at least for a duration threshold, the first supply-side current has met or exceeded a magnitude threshold; and then (ii) reduce the first supply-side current using the first supply-side switch such that the first supply-side current is less than the magnitude threshold, wherein the duration threshold dynamically varies in response to the magnitude of the first supply-side current, wherein the fault management controller comprises: first current signal qualifying circuitry comprising a first comparator configured to compare the magnitude of the first supply-side current to the magnitude threshold and output a first comparator output signal; and signal on-delay circuitry comprising an on-delay timer that is electrically coupled to the output of the first comparator and that is configured to output a fault signal when the first comparator output signal has indicated that the magnitude of the first supply-side current has exceeded the magnitude threshold for the duration threshold, wherein the first supply-side current is reduced in response to the first comparator output signal indicating that the magnitude of the first supply-side current exceeds the magnitude threshold, and when the on-delay timer concurrently outputs the fault signal, and wherein the signal on-delay circuitry further comprises timer delay period circuitry configured to determine the duration threshold that varies in response to the magnitude of the first supply-side current from a lookup table or formulaically based on the magnitude of the first supply-side current.

2. The system of claim 1, wherein the duration threshold is at least as long as an on-time (Ton) of the pulse width modulation signal.

3. The system of claim 1, wherein the signal on-delay circuitry further comprises a delay selector switch communicatively coupled to the on-delay timer, wherein the delay selector switch is movable between a constant delay state that causes the on-delay timer to use a constant value for the duration threshold, and an adaptive delay state that causes the on-delay timer to use as the duration threshold a value that varies in response to the magnitude of the first supply-side current.

4. The system of claim 1, further comprising a pulse current demodulator communicatively coupled to the first comparator to receive and demodulate the first comparator output signal.

5. The system of claim 1, wherein the pulse generator comprises:
   (a) first pulse generation circuitry configured to output the pulse width modulation signal; and
   (b) period generation circuitry communicatively coupled to the first pulse generation circuitry to set a period of the pulse width modulation signal, the period generation circuitry comprising dynamic maximum period circuitry configured to determine the period based on a magnitude of the first remote-side current from a lookup table or formulaically.

6. The system of claim 5, wherein the period generation circuitry further comprises a period selector switch movable between a constant period state that outputs a fixed value for the period to the first pulse generation circuitry, and a dynamic period state that outputs the period as determined by the dynamic maximum period circuitry to the pulse generation circuitry.

7. The system of claim 1, wherein the pulse generator comprises:
   (a) first pulse generation circuitry;
   (b) second pulse generation circuitry comprising a data packet register communicatively coupled to a pulse current modulator; and
   (c) an output selector switch operable to select an output of the first pulse generation circuitry or of the second pulse generation circuitry to be used as the output of the pulse generator.

8. The system of claim 1, further comprising:
   (a) a second supply-side current sensor for measuring a second supply-side current entering a second conductor from the power supply, wherein the first and second conductors are electrically coupled together in parallel;
   (b) a second supply-side switch for adjusting a magnitude of the second supply-side current; and
   (c) a second remote-side switch for turning a second remote-side current on and off, wherein the second remote-side current enters the load from the second conductor,
   and wherein:
   (d) the pulse generator delivers interleaved power to the load by alternately switching the first and second remote-side switches on and off; and
   (e) the fault management controller is also for communicating with the second supply-side current sensor and the second supply-side switch, and is further configured to:
      (i) determine that, at least for a duration threshold, the second supply-side current has met or exceeded the magnitude threshold; and then
      (ii) reduce the second supply-side current using the second supply-side switch such that the second supply-side current is less than the magnitude threshold while the first supply-side current is reduced below the magnitude threshold.

9. The system of claim 8, wherein the fault management controller comprises:
   (a) first current signal qualifying circuitry comprising a first comparator configured to compare a magnitude of the first supply-side current to the magnitude threshold and output a first comparator output signal;
   (b) second current signal qualifying circuitry comprising a second comparator configured to compare a magnitude of the second supply-side current to the magnitude threshold and output a second comparator output signal; and
   (c) signal on-delay circuitry comprising a qualifying delay timer that is electrically coupled to outputs of the first and second comparators and that is configured to output a fault signal when the first and second comparator output signals both indicate that each of the magnitudes of the first and second supply-side currents have exceeded the magnitude threshold for the duration threshold,
   wherein the first and second supply-side currents are reduced in response to the qualifying delay timer outputting the fault signal.

10. The system of claim 8, wherein the pulse generator alternately switches the first and second remote-side switches on and off according to different phase shifts.

11. The system of claim 1, further comprising:
   (a) a second supply-side current sensor for measuring a second supply-side current entering a second conductor from the power supply, wherein the first and second conductors are electrically coupled together in parallel;
   (b) a second supply-side switch for adjusting a magnitude of the second supply-side current; and
   (c) a second remote-side switch for turning a second remote-side current on and off, wherein the second remote-side current enters the load from the second conductor,
   and wherein:
   (d) the pulse generator delivers interleaved power to the load by alternately switching the first and second remote-side switches on and off; and
   (e) the fault management controller is also for communicating with the second supply-side current sensor and the second supply-side switch, and is further configured to permit the second supply-side current to exceed the magnitude threshold while the first supply-side current is reduced below the magnitude threshold.

12. The system of claim 1, wherein the first supply-side switch comprises part of the power supply, and wherein the fault management controller is configured to modulate the first supply-side switch to reduce the first supply-side current to a non-zero value.

13. The system of claim 1, wherein the first supply-side switch is opened to reduce the first supply-side current to zero.

14. Use of the system of claim 1 to transmit data from the pulse generator to the fault management controller.

15. A method comprising:
(a) measuring a first supply-side current flowing from a power supply into a first conductor, wherein the first conductor electrically couples the power supply to a load;
(b) delivering power to the load by modulating a first remote-side current on and off, wherein the first remote-side current enters the load from the first conductor;
(c) determining that, at least for a duration threshold, the first supply-side current has met or exceeded a magnitude threshold; and
(d) after the determining, reducing the first supply-side current such that the first supply-side current is less than the magnitude threshold,
wherein the duration threshold dynamically varies in response to the magnitude of the first supply-side current, and
wherein the duration threshold is determined from a lookup table based on the magnitude of the first supply-side current, or formulaically based on the magnitude of the first supply-side current.

16. The method of claim 15 wherein the duration threshold is at least as long as an on-time (Ton) of a pulse width modulation signal used to modulate the first remote-side current.

17. The method of claim 15, further comprising demodulating a signal in the first supply-side current generated by modulation of the first remote-side current.

18. The method of claim 15, wherein a pulse width modulation signal is used to modulate the first remote-side current, and further comprising determining a period of the pulse width modulation signal based on a magnitude of the first remote-side current.

19. The method of claim 18, wherein the period of the pulse width modulation signal is determined from a lookup table based on the magnitude of the first remote-side current, or formulaically based on the magnitude of the first remote-side current.

20. The method of claim 15, wherein a pulse width modulation signal is used to modulate the first remote-side current, and wherein the pulse width modulation signal is modulated so as to encode a signal therein.

21. The method of claim 15, wherein a second conductor also electrically couples the power supply to the load, wherein the delivering of the power to the load also comprises modulating a second remote-side current that enters the load from the second conductor on and off so as to interleave the first and second remote-side currents, and further comprising:
(a) determining that, at least for the duration threshold, the second supply-side current has met or exceeded the magnitude threshold; and then
(b) reducing the second supply-side current such that the second supply-side current is less than the magnitude threshold while the first supply-side current is reduced below the magnitude threshold.

22. The method of claim 21, wherein the first and second remote-side currents are modulated according to different phase shifts.

23. The method of claim 15, wherein a second conductor also electrically couples the power supply to the load, wherein the delivering of the power to the load also comprises modulating a second remote-side current that enters the load from the second conductor on and off so as to interleave the first and second remote-side currents, and further comprising permitting the second supply-side current to exceed the magnitude threshold while the first supply-side current is reduced below the magnitude threshold.

24. The method of claim 15, wherein reducing the first supply-side current comprises modulating at least one switch such that the first supply-side current is reduced to a non-zero value.

25. The method of claim 15, wherein reducing the first supply-side current comprises opening at least one switch to reduce the first supply-side current to zero.

26. A system comprising: (a) a first supply-side current sensor for measuring a first supply-side current entering a first conductor from a power supply; (b) a first supply-side switch for adjusting a magnitude of the first supply-side current; (c) a first remote-side switch for turning a first remote-side current on and off, wherein the first remote-side current enters a load from the first conductor; (d) a pulse generator configured to generate a pulse width modulation signal for modulating the first remote-side switch to turn the first remote-side current on and off; and (e) a fault management controller for communicating with the first supply-side current sensor and the first supply-side switch and configured to: (i) determine that, at least for a duration threshold, the first supply-side current has met or exceeded a magnitude threshold; and then (ii) reduce the first supply-side current using the first supply-side switch such that the first supply-side current is less than the magnitude threshold, wherein the duration threshold dynamically varies in response to the magnitude of the first supply-side currents wherein the fault management controller comprises: first current signal qualifying circuitry comprising a first comparator configured to compare the magnitude of the first supply-side current to the magnitude threshold and output a first comparator output signal; and signal on-delay circuitry comprising an on-delay timer that is electrically coupled to the output of the first comparator and that is configured to output a fault signal when the first comparator output signal has indicated that the magnitude of the first supply-side current has exceeded the magnitude threshold for the duration threshold, wherein the first supply-side current is reduced in response to the first comparator output signal indicating that the magnitude of the first supply-side current exceeds the magnitude threshold, and when the on-delay timer concurrently outputs the fault signal, wherein the signal on-delay circuitry further comprises a delay selector switch communicatively coupled to the on-delay timer, and wherein the delay selector switch is switchable between a constant delay state that causes the on-delay timer to use a constant value for the duration threshold, and an adaptive delay state that causes the on-delay timer to use as the duration threshold a value that varies in response to the magnitude of the first supply-side current.

27. A The system of claim 26, wherein the duration threshold is at least as long as an on-time (Ton) of the pulse width modulation signal.

28. The system of claim 26, wherein the signal on-delay circuitry further comprises timer delay period circuitry configured to determine the value that varies in response to the magnitude of the first supply-side current from a lookup table or formulaically based on the magnitude of the first supply-side current.

29. The system of claim 26, further comprising a pulse current demodulator communicatively coupled to the first comparator to receive and demodulate the first comparator output signal.

30. The system of claim 26, wherein the pulse generator comprises:
  (a) first pulse generation circuitry configured to output the pulse width modulation signal; and
  (b) period generation circuitry communicatively coupled to the first pulse generation circuitry to set a period of the pulse width modulation signal, the period generation circuitry comprising dynamic maximum period circuitry configured to determine the period based on a magnitude of the first remote-side current from a lookup table or formulaically.

31. The system of claim 30, wherein the period generation circuitry further comprises a period selector switch movable between a constant period state that outputs a fixed value for the period to the first pulse generation circuitry, and a dynamic period state that outputs the period as determined by the dynamic maximum period circuitry to the first pulse generation circuitry.

32. The system of claim 26, wherein the pulse generator comprises:
  (a) first pulse generation circuitry;
  (b) second pulse generation circuitry comprising a data packet register communicatively coupled to a pulse current modulator; and
  (c) an output selector switch operable to select an output of the first pulse generation circuitry or of the second pulse generation circuitry to be used as the output of the pulse generator.

33. The system of claim 26, further comprising:
  (a) a second supply-side current sensor for measuring a second supply-side current entering a second conductor from the power supply, wherein the first and second conductors are electrically coupled together in parallel;
  (b) a second supply-side switch for adjusting a magnitude of the second supply-side current; and
  (c) a second remote-side switch for turning a second remote-side current on and off, wherein the second remote-side current enters the load from the second conductor,
  and wherein:
  (d) the pulse generator delivers interleaved power to the load by alternately switching the first and second remote-side switches on and off; and
  (e) the fault management controller is also for communicating with the second supply-side current sensor and the second supply-side switch, and is further configured to:
    (i) determine that, at least for a duration threshold, the second supply-side current has met or exceeded the magnitude threshold; and then
    (ii) reduce the second supply-side current using the second supply-side switch such that the second supply-side current is less than the magnitude threshold while the first supply-side current is reduced below the magnitude threshold.

34. The system of claim 33, wherein the fault management controller comprises:
  (a) first current signal qualifying circuitry comprising a first comparator configured to compare a magnitude of the first supply-side current to the magnitude threshold and output a first comparator output signal;
  (b) second current signal qualifying circuitry comprising a second comparator configured to compare a magnitude of the second supply-side current to the magnitude threshold and output a second comparator output signal; and
  (c) signal on-delay circuitry comprising a qualifying delay timer that is electrically coupled to outputs of the first and second comparators and that is configured to output a fault signal when the first and second comparator output signals both indicate that each of the magnitudes of the first and second supply-side currents have exceeded the magnitude threshold for the duration threshold,
  wherein the first and second supply-side currents are reduced in response to the qualifying delay timer outputting the fault signal.

35. The system of claim 33, wherein the pulse generator alternately switches the first and second remote-side switches on and off according to different phase shifts.

36. The system of claim 26, further comprising:
  (a) a second supply-side current sensor for measuring a second supply-side current entering a second conductor from the power supply, wherein the first and second conductors are electrically coupled together in parallel;
  (b) a second supply-side switch for adjusting a magnitude of the second supply-side current; and
  (c) a second remote-side switch for turning a second remote-side current on and off, wherein the second remote-side current enters the load from the second conductor,
  and wherein:
  (d) the pulse generator delivers interleaved power to the load by alternately switching the first and second remote-side switches on and off; and
  (e) the fault management controller is also for communicating with the second supply-side current sensor and the second supply-side switch, and is further configured to permit the second supply-side current to exceed the magnitude threshold while the first supply-side current is reduced below the magnitude threshold.

37. The system of claim 26, wherein the first supply-side switch comprises part of the power supply, and wherein the fault management controller is configured to modulate the first supply-side switch to reduce the first supply-side current to a non-zero value.

38. The system of claim 26, wherein the first supply-side switch is opened to reduce the first supply-side current to zero.

39. Use of the system of claim 26 to transmit data from the pulse generator to the fault management controller.

* * * * *